US012122943B2

(12) United States Patent
Lonberg et al.

(10) Patent No.: US 12,122,943 B2
(45) Date of Patent: Oct. 22, 2024

(54) BLENDED FURNISH WITH IMPROVED PERFORMANCE AND METHODS OF MAKING AND USING THE SAME

(71) Applicant: ARCLIN USA LLC, Roswell, GA (US)

(72) Inventors: Samuel W. Lonberg, Moncure, NC (US); Matthew E. Tucker, Moncure, NC (US)

(73) Assignee: Arclin USA LLC, Alpharetta, GA (US)

(*) Notice: Subject to any disclaimer, the term of this patent is extended or adjusted under 35 U.S.C. 154(b) by 0 days.

(21) Appl. No.: 18/170,450

(22) Filed: Feb. 16, 2023

(65) Prior Publication Data
US 2023/0193092 A1 Jun. 22, 2023

Related U.S. Application Data

(63) Continuation-in-part of application No. 17/590,466, filed on Feb. 1, 2022.

(60) Provisional application No. 63/282,514, filed on Nov. 23, 2021, provisional application No. 63/145,174, filed on Feb. 3, 2021.

(51) Int. Cl.
C09J 161/24 (2006.01)
B32B 7/12 (2006.01)
B32B 21/02 (2006.01)
B32B 21/13 (2006.01)
B32B 21/14 (2006.01)
C08G 12/12 (2006.01)
C08G 12/38 (2006.01)
C08H 8/00 (2010.01)
C09J 161/28 (2006.01)

(52) U.S. Cl.
CPC ............ C09J 161/24 (2013.01); B32B 7/12 (2013.01); B32B 21/02 (2013.01); B32B 21/13 (2013.01); B32B 21/14 (2013.01); C08G 12/12 (2013.01); C08G 12/38 (2013.01); C08H 8/00 (2013.01); C09J 161/28 (2013.01); B32B 2307/402 (2013.01); B32B 2307/418 (2013.01)

(58) Field of Classification Search
CPC ......... C09J 161/24; C09J 161/28; C08H 8/00; C08L 97/00
See application file for complete search history.

(56) References Cited

U.S. PATENT DOCUMENTS 3,076,772 A * 2/1963 Christ .................... C09J 161/34
156/335
3,390,920 A 7/1968 Dobrikin
3,790,441 A 2/1974 Ashall
3,790,442 A 2/1974 Ashall
3,994,850 A * 11/1976 Willegger ............... C09J 161/24
525/509
4,177,313 A 12/1979 Herault
4,186,242 A 1/1980 Holmquist
4,194,997 A 3/1980 Edler
4,244,846 A 1/1981 Edler
4,501,628 A * 2/1985 McGuire .................. C08K 5/16
264/109
4,654,259 A * 3/1987 Stofko .................... C09J 161/20
156/328
4,886,854 A 12/1989 Markessini et al.
5,075,402 A 12/1991 Schmitt et al.
6,291,558 B1 9/2001 Raskin et al.
8,252,864 B2 8/2012 Motter et al.
9,133,374 B2 9/2015 Yeager et al.
9,404,221 B2 8/2016 Hagiopol et al.
9,868,857 B2 1/2018 Jing
9,920,204 B2 3/2018 Earnshaw
2006/0057353 A1 3/2006 Motter et al.
2014/0113123 A1 4/2014 Chuda et al.
2014/0202647 A1 7/2014 Hagiopol et al.
2016/0009967 A1 1/2016 Yeager et al.
2016/0096985 A1 4/2016 Knight et al.
2017/0204565 A1 7/2017 Ringold et al.
2022/0242995 A1* 8/2022 Lonberg ................... B27N 3/02

FOREIGN PATENT DOCUMENTS

| BE | 0832584 A | 12/1975 |
|---|---|---|
| CA | 3147313 A1 | 8/2022 |
| CN | 107236500 A | 10/2017 |
| EP | 0041745 A1 | 12/1981 |
| EP | 0454888 A1 | 11/1991 |
| EP | 1789463 A1 | 5/2007 |
| GB | 1240616 A | 7/1971 |
| RO | 89056 A3 | 4/1986 |
| RU | 2495896 C1 | 10/2013 |
| WO | 79/00977 A1 | 11/1979 |
| WO | 2016/057390 A1 | 4/2016 |
| WO | 2019/180235 A1 | 9/2019 |

(Continued)

OTHER PUBLICATIONS

Zorba et al. (Journal of Thermal Analysis and Calorimetry, 92, 2008, 1, 29-33) (Year: 2008).*
Zheng et al. (Bioresources 8(4), 5500-5514, 2013) (Year: 2013).*
Angelini, Stefania, et al. "Lignosulfonates as Fire Retardants in Wood Flour-Based Particleboards." International Journal of Polymer Science, vol. 2019 Article 6178163 (2019): 1-10.
Antov, P., et al. "Experimental and statistical modeling of the exploitation properties of eco-friendly MDF through, variation of lignosulfonate concentration and hot pressing temperature." Proceedings of the 2nd International Congresi Jf Biorefinery of Lignocellulosic Materials {IWBLCM2019), Cordoba, Spain. (2019): 1-6.
Antov, Petar, et al. "Development of Wood Composites from Recycled Fibres Bonded with Magnesium Lignosulfonate." Forests 11,613 (2020): 1-11.

(Continued)

Primary Examiner — Liam J Heincer
(74) Attorney, Agent, or Firm — Ram W. Sabnis

(57) ABSTRACT

A blended furnish with improved performance characteristics while reducing environmental impact, when applied to a substrate and methods of making and using blended furnish are provided. A composite product using a blended furnish is also provided.

25 Claims, 11 Drawing Sheets

(56) References Cited

FOREIGN PATENT DOCUMENTS

WO 2022/169733 A1 8/2022

OTHER PUBLICATIONS

Antov, Petar, et al. "Medium-density fibreboards bonded with phenol formaldehyde resin and calcium lignosulfonate as an eco-friendly additive." Wood Material Science & Engineering 16.1 (2020): 42-48.

Chen, Rubie, et al. "Modified Lignosulfonate as Adhesive." Journal of Applied Polymer Science 52.3 (1994): 437-443.

El'Bert, A. A., et al. "Using lignosulfonates in the manufacture of particleboards." Izvestiya Vysshikh Uchebnykh Zavedenii, Lesnoi Zhurnal 3 (1990): 89-95, English Abstract.

Guo, Ming Hui, et al. "Performance Analysis of Ammonium Lignosulfonate/Urea Formaldehyde-Free Fiberboards." Advanced Materials Research vol. 113 (2010): 1774-1778.

International Search Report and Written Opinion for corresponding International application No. PCT/US2022/014675; dated May 11, 2022 (12 pages).

Janowiak, John J., et al. "Methyl Glucoside and Lignosulphonate extenders for use with particleboard UF resins." Forest Products Journal 48.11/12 (1998): 65-70.

Martin, Francisco L., "Lignosulfonate as a Strength Additive for Non-Wood Paperboard" (2000). Senior Thesis, Western Michigan University (2000): 1-47.

Rosa, Thiago, et al. "Use of ammonium lignosulfonate in the production of particleboards." Brazilian Journal of Wood Science 5.2 (2014): 93-102 {English Abstract}.

Savov V., et al. "Processing factors for production of eco-friendly medium density fibreboards based on lignosulfonate adhesives." Proceedings of the 2nd International Congress of Biorefinery of Lignocellulosic Materials (WBLCM 2019), Cordoba, Spain. (2019):165-169.

Savov, Viktor "Influence of the Content of Lignosulfonate on Physical Properties of Medium Density Fiberboard." Pro Ligno 13.4 (2017): 247-251.

SRM Beer Color Scale, www.homebrewing.org, 2017 [retrieved on Jan. 27, 2022] Retrieved from the Internet: <URL: https://www.homebrewing.org/SRM-Beer-Color-Scale_ep_81-1.html> (3 pages).

Yotov, N., et al. "Lignosulphonate and waste technical hydrolysis lignin as adhesives for eco-friendly fiberboard." Bulgarian Chemical Communications 49.L (2017): 92-97.

* cited by examiner

BLENDED FURNISH WITH IMPROVED PERFORMANCE AND METHODS OF MAKING AND USING THE SAME

CROSS-REFERENCE TO RELATED APPLICATIONS

This application is a continuation-in-part application of U.S. patent application Ser. No. 17/590,466, filed Feb. 1, 2022, and claims benefit of and priority to U.S. Provisional Application No. 63/145,174 filed on Feb. 3, 2021, and U.S. Provisional Application No. 63/282,514, filed Nov. 23, 2021, all of which are herein incorporated by reference in their entirety.

FIELD OF THE INVENTION

The present invention relates to a blended furnish with improved performance when applied to a substrate. The present invention relates to a composite product using a blended furnish.

BACKGROUND OF THE INVENTION

Melamine-Urea-Formaldehyde (MUF) resins have become popular for use as adhesives in particle boards (PB) or medium density fiberboards (MDF), as they have been found to reliably enhance physical properties, such as Internal Bond (IB) strength, Modulus of Rupture (MOR), Modulus of Elasticity (MOE), and water-resistant properties, as measured by Water Absorption (WA) and Thickness Swell (TS), compared to urea-formaldehyde (UF) resins. Urea-formaldehyde resins are well known in the art for the same applications, however, these resins have been found to produce relatively weaker particle boards and medium density fiber boards with poor water-resistant properties as evidenced by the graph in FIG. 10. FIG. 10 shows the difference in Internal Bond Strength between UF resins and MUF resins at equivalent molar ratio of F to U and F to M+U (hereinafter the MR ratio), respectively with increased board groups.

Although MUF resins provide these enhanced features, there is a need for an alternative to melamine which is more environmentally friendly, while maintaining the same resin performance.

WO 2016/057390 (WO '390) relates to adhesives containing about 20 wt. % to about 40 wt. % of an aldehyde-based resin, 1 wt. % to about 15 wt. % of a kraft lignin, 0.05 wt. % to about 2 wt. % of a surfactant, and 0.5 wt. % to about 10 wt. % of an alkaline compound, and methods for making and using the same. The adhesives of WO '390 may have a viscosity of from about 500 cP to about 5,000 cP, at a temperature of about 25° C.

U.S. Pat. No. 8,252,864 (US '864) relates to a curable urea/formaldehyde resin composition and a reconstituted wood product made by combining the curable urea/formaldehyde resin with a particulate lignocellulosic material.

There is still a need to modify amino resins to improve the performance characteristics of the adhesive while reducing environmental impact by consuming byproducts from other industrial processes.

SUMMARY OF THE INVENTION

In some embodiments, a blended furnish, can include a urea-formaldehyde (UF) resin or a melamine-urea-formaldehyde (MUF) resin; a lignosulfonate or a kraft lignin; an alkaline compound; optionally an additive; and a plurality of substrates, wherein the blended furnish has a buffer capacity of 2-200 mL of 0.1 N HCl by the Acid Titration Value (ATV) Method using 20 grams of blended furnish for a period of time up to 20 days.

In other embodiments, a method for preparing a blended furnish, can include adding a plurality of substrates; mixing a urea-formaldehyde (UF) resin or a melamine-urea-formaldehyde (MUF) resin optionally with an amine and water at a pH of 5-11, preferably 6-10; optionally adding one or more additives; adding a lignosulfonate salt or a kraft lignin; optionally adding one or more additives to form the blended furnish, wherein the blended furnish has a buffer capacity of 2-200 mL of 0.1 N HCl by the Acid Titration Value (ATV) Method using 20 grams of blended furnish for a period of time up to 20 days.

In certain embodiments, a method for preparing a blended furnish, can include adding a plurality of substrates; mixing a urea-formaldehyde (UF) resin or a melamine-urea-formaldehyde (MUF) resin, a lignosulfonate salt or a kraft lignin optionally with an amine and water at a pH of 5-11, preferably 6-10; optionally adding one or more additives to form the blended furnish, wherein the blended furnish has a buffer capacity of 2-200 mL of 0.1 N HCl by the Acid Titration Value (ATV) Method using 20 grams of blended furnish for a period of time up to 20 days.

In some embodiments, a method for preparing a blended furnish, can include adding a plurality of substrates; mixing a lignosulfonate salt or a kraft lignin with the substrates; adding a urea-formaldehyde (UF) resin or a melamine-urea-formaldehyde (MUF) resin optionally with an amine and water at a pH of 5-11, preferably 6-10; optionally adding one or more additives to form the blended furnish, wherein the blended furnish has a buffer capacity of 2-200 mL of 0.1 N HCl by the Acid Titration Value (ATV) Method using 20 grams of blended furnish for a period of time up to 20 days.

In further embodiments, a composite product, can include a plurality of substrates; and at least partially cured blended furnish, wherein the blended furnish, prior to curing, can include a urea-formaldehyde (UF) resin or a melamine-urea-formaldehyde (MUF) resin; a lignosulfonate or a kraft lignin; an alkaline compound; and optionally one or more additives; wherein the blended furnish has a buffer capacity of 2-200 mL of 0.1 N HCl by the Acid Titration Value (ATV) Method using 20 grams of blended furnish for a period of time up to 20 days.

In order to satisfy this need, the present disclosure relates to a resin system and methods of making resin system wherein lignosulfonate is added to UF and MUF adhesives. An aspect of the present invention is based on the addition of lignosulfonate to amino resins which improves the performance characteristics of the adhesive while reducing environmental impact by consuming byproducts from other industrial processes.

In a first aspect, the disclosure relates to a resin system comprising:
  a urea-formaldehyde (UF) resin or melamine-urea-formaldehyde (MUF), prepared by:
    mixing one or more urea compounds, one or more formaldehyde compounds, a buffering and stabilizing agent and optionally one or more melamine compounds to form a mixture, optionally heating while mixing for at least one minute to form a UF resin or MUF resin, wherein the UF resin or MUF resin has a molar ratio (MR) of total moles formaldehyde to total moles urea plus, if present, the one or more melamine compounds of from about 0.25:1 to about 2.50:1, or from about 0.25:1 to about 1.5:1, and if a pH of the UF resin or MUF resin is not 6.5 to about 10.0, or from about 8.0 to about 10.0, or from about 8.0 to about 9.0 then one or more alkaline compounds or acidic compounds are mixed with the UF resin or MUF resin until the pH is 6.5 to about 10.0, or from about 8.0 to about 10.0, or from about 8.0 to about 9.0 to form the resin system, wherein one or more lignosulfonate compounds are added to the mixture or are added to the formed UF resin or MUF resin in an amount of from about 0.1 wt. % to about 30 wt. %, or from about 1.0 wt. % to about 20 wt. %, or from about 1.0 wt. % to about 10 wt. %, based on a total weight of the resin system, about 0.0 wt. % to about 40 wt. % of water, based on the total weight of the resin system, and wherein the resin system has a buffer capacity of 2 to 400 mL, or greater than 5 to 150 mL, preferably 20 to 60 mL of 0.1 N HCl by the ATV Method for a period of time of at least about 20 days at 25° C.

In the foregoing embodiment, the urea-formaldehyde (UF) resin or melamine-urea-formaldehyde (MUF), may be prepared by:

mixing a first set of components comprising one or more urea compounds and one or more formaldehyde compounds and optionally one or more melamine compounds, optionally heating while mixing for at least one minute to form a first reaction product having an initial molar ratio (IMR) of total moles of the one or more formaldehyde compounds to moles of the one or more urea compounds plus, if present, the one or more melamine compounds of from about 0.7:1 to 7:1, or about 1:1 to 5:1, or 1.4:1 to 4.5:1 up to the end of condensation, mixing the first reaction product with a second set of components comprising one or more urea compounds and a buffering and stabilizing agent and optionally one or more melamine compounds, optionally heating while mixing to form the UF resin or MUF resin, wherein the UF resin or MUF resin may have a molar ratio (MR) of total moles formaldehyde to total moles urea plus, if present, the one or more melamine compounds of from about 0.25:1 to about 2.50:1, or from about 0.25:1 to about 1.5:1, and if a pH of the UF resin or MUF resin is not 6.5 to about 10.0, or from about 8.0 to about 10.0, or from about 8.0 to about 9.0 then one or more alkaline compounds or acidic compounds may be mixed with the UF resin or MUF resin until the pH is 6.5 to about 10.0, or from about 8.0 to about 10.0, or from about 8.0 to about 9.0 to form the resin system, wherein one or more lignosulfonate compounds may be included with the first set of components and/or with the second set of components and/or after the formation of the UF resin or MUF resin in an amount of from about 0.1 wt. % to about 30 wt. %, or from about 1.0 wt. % to about 20 wt. %, or from about 1.0 wt. % to about 10 wt. %, based on a total weight of the resin system, about 0.0 wt. % to about 40 wt. % of water, based on the total weight of the resin system, and wherein the resin system may have a buffer capacity of 2 to 400 mL, or greater than 5 to 150 mL, preferably 20 to 60 mL of 0.1 N HCl by the ATV Method for a period of time of at least about 20 days at 25° C. This second step of mixing the first reaction product with a second set of components comprising one or more urea compounds and a buffering and stabilizing agent can be performed for any number of reasons, one of which may be to tie up any excess formaldehyde left over from the first step. The inventive resin system can be prepared in one step, two steps, three steps or more.

In each of the foregoing embodiment, one or more melamine compounds can be added, or melamine compounds can be excluded, or Kraft lignin can be excluded.

In each of the foregoing embodiments, the one or more melamine compounds can be added in up to a 1:1 molar ratio with the total moles of the one or more urea compounds in the resin system, or the one or more melamine compounds can be added in 0.001:1 to a 0.5:1 molar ratio with the total moles of the one or more urea compounds in the resin system, or the one or more melamine compounds can be added in a 0.01:1 to 0.25:1 molar ratio with the total moles of the one or more urea compounds in the resin system.

In each of the foregoing embodiments, the resin system comprising the one or more lignosulfonate may have a color that is noticeably different than the color of pure UF/MUF resins; or wherein within 72 hours following formation of the resin system, 1 liter of the resin system may have an orange yellow, red, tan or brown color; or wherein within 72 hours following formation of the resin system, the resin system may have a color which is in the range of 4 to 40+using the official AIH SRM (Standard Research Method) Number Scale for the color of beer. Alternatively, the resin system is in a range of 19 to 36, or 20 to 35 using the official AIH SRM (Standard Research Method) Number Scale.

In each of the foregoing embodiments, the resin system may include
about 5 wt. % to about 40 wt. %, or from about 10 wt. % to about 35 wt. %, or from about 15 wt. % to about 30 wt. % of the one or more formaldehyde compounds,
about 5 wt. % to about 35 wt. %, or from about 10 wt. % to about 30 wt. % or from about 15 wt. % to about 25 wt. % of the one or more urea compounds in the first set of components,
about 5 wt. % to about 50 wt. %, or from about 10 wt. % to about 45 wt. %, or from about 15 wt. % to about 40 wt. % of the one or more urea compounds in the second set of components,
about 0.1 wt. % to about 30 wt. %, or about 0.1 wt. % to about 25 wt. %, or about 0.1 wt. % to about 20 wt. %, or about 1.0 wt. % to about 15 wt. %, or about 2.0 wt. % to about 5.0 wt. %, or more than 2.0 wt. % to about 5.0 wt. % of the lignosulfonate,
about 0.0 wt. % to about 40 wt. % of water, and
wherein each weight percent is based on the total weight of the resin system.

In each of the foregoing embodiments, the pH of the resin system, which is from greater than 6.5 to about 10.0, or from about 8.0 to about 9.0, can be due to the effect from the buffering and stabilizing agent and there is no need to add one or more alkaline compounds or acidic compounds. In each of the foregoing embodiments, the resin system may include the melamine in an amount of from about 0.0 wt. % to about 30 wt. % or from about 0.0 wt. % to about 25 wt. %, or from about 0.0 wt. % to about 20 wt. % or from about 0.1 wt. % to about 15 wt. %, based on the total weight of the resin system. In some embodiments, no melamine is added to the resin composition.

In each of the foregoing embodiments, the lignin species may be selected from calcium lignosulfonate, magnesium lignosulfonate, ammonium lignosulfonate, or sodium lignosulfonate, preferably ammonium lignosulfonate or sodium lignosulfonate.

In each of the foregoing embodiments, the UF or MUF resin, excluding the lignin species, may have a number average molecular weight (Mn) of from about 300 daltons to about 20,000 daltons, or from about 1,000 daltons to about 10,000 daltons, or from about 1,500 daltons to about 9,000 daltons, or from about 2,000 daltons to about 5,000 daltons; the weight average molecular weight (Mw) is about 1,000 to about 400,000, or from about 30,000 to about 200,000 daltons, as measured by gel permeation chromatography; and the polydispersity (Mw/Mn) is about 10-100.

In each of the foregoing embodiments, the alkaline compound may be selected from a Group I or II metal hydroxide, preferably the alkaline compound is sodium hydroxide, potassium hydroxide, ammonium hydroxide, or any mixture thereof.

In each of the foregoing embodiments, the resin system is stable and may have a kinematic viscosity of about 100 to about 1,500 cSt, or about 100 to about 1,000 cSt, or about 100 to about 600 cSt at a temperature of about 25° C., as measured by the Gardner-Holdt viscosity method, for a period of time of at least about 20 days at 25° C., and wherein the period of time starts when the resin system is initially produced, and the resin system may have a fast cure rate so to achieve an improvement in internal bond strength when compared to the Control resin system of up to 20%, preferably 10% to 20% at <7.0 press factor at 350° F. platen temperature. When measured at full cure at <7.0 press factor at 350° F. platen temperature, the IB is at least as good for the inventive resin as compared to the comparative resin. The control resin is a UF resin of Comparative Example B, below.

In a second aspect, the disclosure relates to an adhesive, including the resin system of each of the foregoing embodiments.

In a third aspect, the disclosure relates to a blended furnish, including a plurality of granulated, or fibrous lignocellulose substrates and the adhesive of the foregoing embodiment.

In a fourth aspect, the disclosure relates to a composite lignocellulosic product, including a plurality of lignocellulosic substrates and an at least partially cured resin system, wherein the resin system, prior to curing, including each of the foregoing embodiments of the resin system.

In the foregoing embodiment, the composite product may be a particleboard, a fiberboard, a plywood, an oriented strand board, or a laminated veneer board, medium density fiberboard, more preferably, the composite product is a particle board or medium density fiberboard.

In a fifth aspect, the disclosure relates to a composite comprising: the inventive resin system of each of the foregoing embodiments and a glass mat or abrasives, or the inventive resin system of each of the foregoing embodiments in a glass fiber nonwoven, or the inventive resin system of each of the foregoing embodiments as an impregnation resin in one or more layers of an overlay.

In the foregoing embodiment, the composite may be a glass fiber nonwoven.

In each of the foregoing embodiments, the glass fiber nonwoven may have an average fiber length of 0.75-2.5 inches, preferably 1.0-1.6 inches. The resin system containing the glass fibers can be cured at 200-250° C. for up to a minute. Preferably the resin system containing the glass fibers can be cured at 230° C. for 15 seconds. Also, the average basis weight of the resin in the composite can be 1.4-2.0 lbs/100 ft$^2$. Preferably, the average basis weight of the resin in the composite can be 1.5-1.75 lbs/100 ft$^2$. In addition, the average loss on ignition can be 15-30%. Preferably, the average loss on ignition can be 18-25%.

In each of the foregoing embodiments, the glass fiber nonwoven which is made from the inventive resin system comprising one or more lignosulfonate compounds may have a dry tensile strength of greater than 10%, preferably greater than 15% to 35%, more preferably greater than 25% to 30% when compared to essentially the same glass fiber nonwoven which is made from the same resin system except without the one or more lignosulfonate compounds. The dry tensile strength of the glass fiber nonwoven products can be tested on a Thwing-Albert tensile tester (150 kg load cell).

In a sixth aspect, the disclosure relates to a method for making a resin system, comprising:
mixing one or more urea compounds, one or more formaldehyde compounds, a buffering and stabilizing agent and optionally one or more melamine compounds to form a mixture, optionally heating while mixing for at least one minute to form a UF resin or MUF resin, wherein the UF resin or MUF resin has a molar ratio (MR) of total moles formaldehyde to total moles urea plus, if present, the one or more melamine compounds of from about 0.25:1 to about 2.50:1, or from about 0.25:1 to about 1.5:1, and
if a pH of the UF resin or MUF resin is not 6.5 to about 10.0, or from about 8.0 to about 10.0, or from about 8.0 to about 9.0 then one or more alkaline compounds or acidic compounds are mixed with the UF resin or MUF resin until the pH is 6.5 to about 10.0, or from about 8.0 to about 10.0, or from about 8.0 to about 9.0 to form the resin system,
wherein one or more lignosulfonate compounds are added to the mixture or are added to the formed UF resin or MUF resin in an amount of from about 0.1 wt. % to about 30 wt. %, or from about 1.0 wt. % to about 20 wt. %, or from about 1.0 wt. % to about 10 wt. %, based on a total weight of the resin system,
about 0.0 wt. % to about 40 wt. % of water, based on the total weight of the resin system, and
wherein the resin system has a buffer capacity of 2 to 400 mL, or greater than 5 to 150 mL, preferably 20 to 60 mL of 0.1 N HCl by the ATV Method for a period of time of at least about 20 days at 25° C.

In the foregoing embodiment, the method for making a resin system may comprise:
mixing a first set of components comprising one of more urea compounds, and one or more formaldehyde compounds, and optionally one or more melamine compounds, optionally heating while mixing for at least one minute to form a first reaction product having an initial molar ratio (IMR) of total moles of the one or more formaldehyde compounds to moles of the one or more urea compounds plus, if present, the one or more melamine compounds of from about 1.4:1 to 5:1, or about 1.4:1 to 3:1, or about 2,
mixing the first reaction product with a second set of components comprising one or more urea compounds and a buffering and stabilizing agent and optionally one or more melamine compounds, and optionally heating while mixing to form a UF resin or MUF resin, wherein the UF resin or MUF resin has a molar ratio (MR) of total moles formaldehyde to total moles urea, plus if present, the one or more melamine compounds of from about 0.25:1 to about 2.50:1, or from about 0.25:1 to about 1.5:1, and if the pH of the UF resin or MUF resin is not 6.5 to about 10.0, or from about 8.0 to about 10.0, or from about 8.0 to about 9.0 then one or more alkaline compounds or acidic compounds may be mixed with the UF resin or MUF resin until the pH of the UF resin or MUF resin is greater than 8.0 or at least 8.4, or is 6.5 to about 10.0, or from about 8.0 to about 10.0, or from about 8.0 to about 9.0 is obtained to form the resin system, wherein one or more lignosulfonate compound are included with the first set of components and/or with the second set of components in an amount of from about 0.1 wt. % to about 30 wt. %, or from about 1.0 wt. % to about 20 wt. %, or from about 1.0 wt. % to about 10 wt. %, based on a total weight of the resin system, about 0.0 wt. % to about 40 wt. % of water, based on the total weight of the resin system, and wherein the resin system has a buffer capacity of 2 to 400 mL, or greater than 5 to 150 mL, preferably 20 to 60 mL of 0.1 N HCl by the ATV Method for a period of time of at least about 20 days at 25° C.

In each of the foregoing embodiments of the method, melamine may be added, melamine may be excluded, or Kraft lignin may be excluded.

In each of the foregoing embodiments of the method, the one or more melamine compounds can be added in up to a 1:1 molar ratio with the total moles of the one or more urea compounds in the resin system, or the one or more melamine compounds can be added in 0.001:1 to a 0.5:1 molar ratio with the total moles of the one or more urea compounds in the resin system, or the one or more melamine compounds can be added in a 0.01:1 to 0.25:1 molar ratio with the total moles of the one or more urea compounds in the resin system.

In each of the foregoing embodiments of the method, the resin system comprising the one or more lignosulfonate may have a color that is noticeably different than the color of pure UF/MUF resins; or wherein within 72 hours following formation of the resin system, 1 liter of the resin system may have an orange yellow, red, tan or brown color; or wherein within 72 hours following formation of the resin system, the resin system may have a color which is in the range of 4 to 40+using the official AIH SRM (Standard Research Method) Number Scale for the color of beer.

In each of the foregoing embodiments of the method, the resin system may include
about 5 wt. % to about 40 wt. %, or from about 10 wt. % to about 35 wt. %, or from about 15 wt. % to about 30 wt. % of the one or more formaldehyde compounds,
about 5 wt. % to about 35 wt. %, or from about 10 wt. % to about 30 wt. % or from about 15 wt. % to about 25 wt. % of the one or more urea compounds in the first set of components,
about 5 wt. % to about 50 wt. %, or from about 10 wt. % to about 45 wt. %, or from about 15 wt. % to about 40 wt. % of the one or more urea compounds in the second set of components,
about 0.1 wt. % to about 30 wt. %, or about 0.1 wt. % to about 25 wt. %, or about 0.1 wt. % to about 20 wt. %, or about 1.0 wt. % to about 15 wt. %, or about 2.0 wt. % to about 5.0 wt. %, or more than 2.0 wt. % to about 5.0 wt. % of the lignosulfonate,
about 0.0 wt. % to about 40 wt. % of water, and
wherein each weight percent is based on the total weight of the resin system.

In each of the foregoing embodiments of the method, the pH of the resin system is from greater than 6.5 to about 10.0, or from about 8.0 to about 9.0 due to the effect from the buffering and stabilizing agent and there is no need to add one or more alkaline compounds or acidic compounds.

In each of the foregoing embodiments of the method, the melamine may be present in an amount of from about 0.0 wt. % to about 30 wt. % or from about 0.0 wt. % to about 25 wt. %, or from about 0.0 wt. % to about 20 wt. % or from about 0.1 wt. % to about 15 wt. %, based on the total weight of the resin system. In some embodiments, no melamine is added to the resin composition.

In each of the foregoing embodiments of the method, the lignin species may be selected from calcium lignosulfonate, magnesium lignosulfonate, ammonium lignosulfonate, or sodium lignosulfonate, preferably ammonium lignosulfonate or sodium lignosulfonate.

In each of the foregoing embodiments of the method, the UF resin or MUF resin, excluding the lignin species, may have a number average molecular weight (Mn) of from about 300 daltons to about 20,000 daltons, or from about 1,000 daltons to 10,000 daltons, or from about 1,500 daltons to about 9,000 daltons, or from about 2,000 daltons to about 5,000 daltons; the weight average molecular weight (Mw) is about 1,000 to about 400,000, or from about 30,000 to about 200,000 daltons; and the polydispersity (Mw/Mn) is about 10-100.

In each of the foregoing embodiments of the method, the alkaline compound may be selected from a Group I or II metal hydroxide, preferably the alkaline compound may be selected from sodium hydroxide, potassium hydroxide, ammonium hydroxide, or any mixture thereof.

In each of the foregoing embodiments of the method, the acidic compound may be selected from chloric acid, hydrobromic acid, hydrochloric acid, hydroiodic acid, nitric acid, perchloric acid, sulfuric acid, sulfurous acid, phosphoric acid, acetic acid, formic acid, benzoic acid, oxalic acid, hydrogen sulfate ion, nitrous acid, hydrofluoric acid, carbonic acid, methanoic acid or any mixtures thereof.

In each of the foregoing embodiments, the resin system is stable and may have a kinematic viscosity of about 100 to about 1500 cSt, or about 100 to about 1,000 cSt, or about 100 to about 600 cSt at a temperature of about 25° C., as measured by the Gardner-Holdt viscosity method, for a period of time of at least about 20 days at 25° C., and wherein the period of time starts when the resin system is initially produced, and the resin system may have a fast cure rate so to achieve an improvement in internal bond strength when compared to the Control resin system of up to 20%, preferably 10% to 20% at <7.0 press factor at 350° F. platen temperature. When measured at full cure at <7.0 press factor at 350° F. platen temperature, the IB is at least as good for the inventive resin as compared to the comparative resin. The control resin is Comparative Example B, discussed below.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION OF THE INVENTION

I. Definitions

Figure 1:
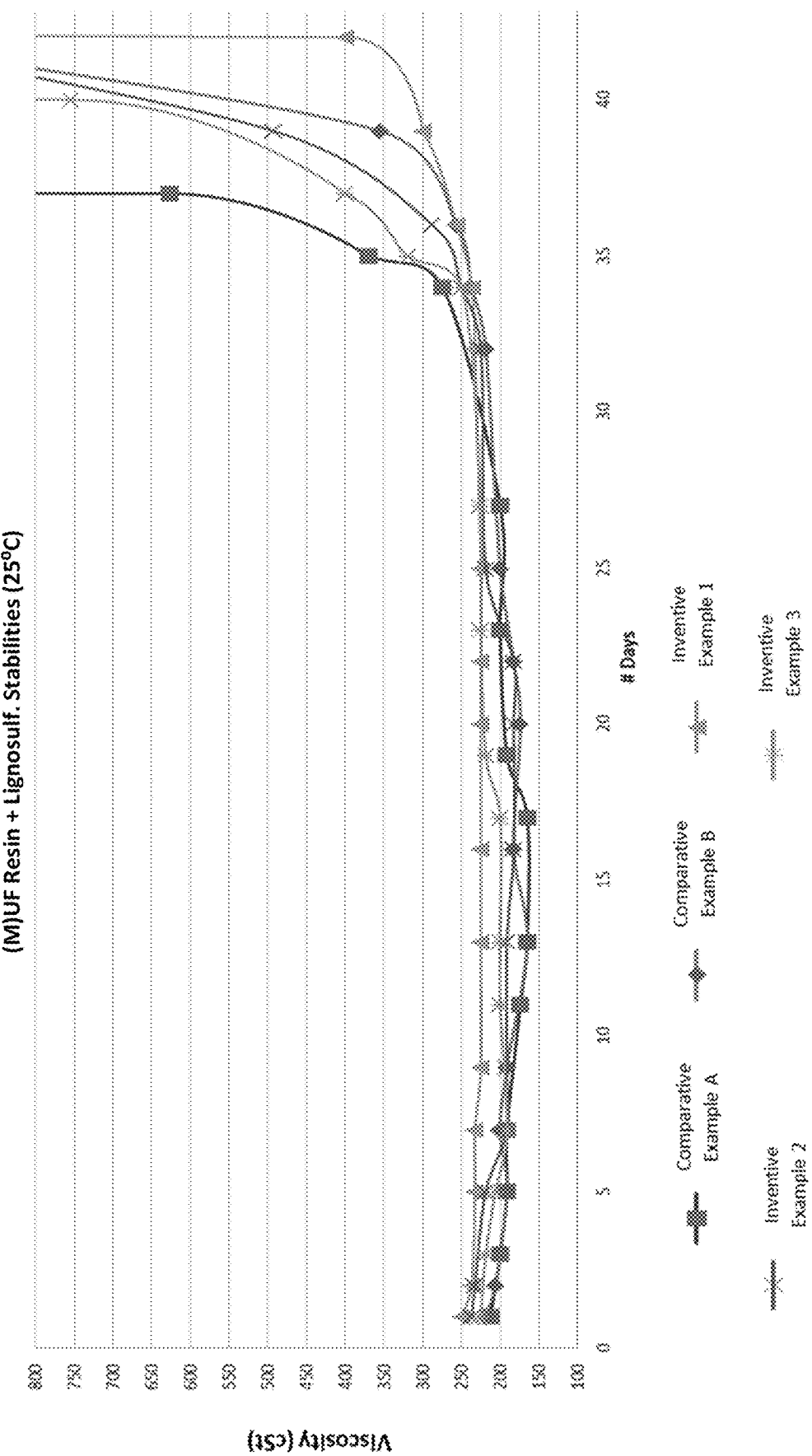
FIG. 1 shows the viscosity stability over time for Comparative Examples A and B and Inventive Examples 1-3 at 25° C.

The following terms are intended to have the meanings presented therewith below and are useful in understanding the description and intended scope of the present invention.

The articles "a" and "an" may be used herein to refer to one or to more than one (i.e., at least one) of the grammatical objects of the article. By way of example "an analogue" means one analogue or more than one analogue.

The term "about" as used herein, refers that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments. Additionally, in phrase "about X to Y," is the same as "about X to about Y," that is the term "about" modifies both "X" and "Y."

The term "compound" as used herein, refers to salts, complexes, isomers, stereoisomers, diastereoisomers, tautomers, and isotopes of the compound or any combination thereof.

The term "comprising" (and any form of comprising, such as "comprise", "comprises", and "comprised"), "having" (and any form of having, such as "have" and "has"), "including" (and any form of including, such as "includes" and "include"), or "containing" (and any form of containing, such as "contains" and "contain"), are used in their inclusive, open-ended, and non-limiting sense.

The term "effective," as that term is used in the specification and/or claims, means adequate to accomplish a desired, expected, or intended result.

The term "coating" refers to a coating in a form that is suitable for application to a substrate as well as the material after it is applied to the substrate, while it is being applied to the substrate, and both before and after any post-application treatments (such as evaporation, cross-linking, curing, and the like). The components of the coating compositions may vary during these stages.

II. Blended Furnish

The invention provides a blended furnish compositions and methods.

In some embodiments, a blended furnish, can include a urea-formaldehyde (UF) resin or a melamine-urea-formaldehyde (MUF) resin; a lignosulfonate or a kraft lignin; an alkaline compound; optionally an additive; and a plurality of substrates, wherein the blended furnish has a buffer capacity of 2-200 mL of 0.1 N HCl by the Acid Titration Value (ATV) Method using 20 grams of blended furnish for a period of time up to 20 days.

In certain embodiments, the substrate is selected from the group consisting of lignocellulose substrates, natural fibers substrates, synthetic fibers substrates, glass fibers substrates and mixtures thereof.

In other embodiments, the lignosulfonate is selected from the group consisting of calcium lignosulfonate, magnesium lignosulfonate, potassium lignosulfonate, chrome lignosulfonate, ammonium lignosulfonate, sodium lignosulfonate and mixtures thereof.

In certain embodiments, the lignosulfonate or the kraft lignin is added to the UF resin or the MUF resin at a resin manufacturer's facility, at a lignosulfonate or kraft lignin supplier's facility, a third party vendor site, in a wood based composite manufacturer's storage tank, in a railcar, truck, or other transportation vehicle or combinations thereof.

In further embodiments, the lignosulfonate or the kraft lignin is blended with other additives selected from the group consisting of a raw lignin in powder or liquid form, a lignin added to additives combined with additional water, a urea water, a scavenger, a filler, an extender, a wax, a catalyst, a release agent, a buffering agent, a surfactant and mixtures thereof.

In certain embodiments, the lignosulfonate or the kraft lignin is added in the process at a digester (MDF), a blow-line (MDF), a blender (PB), a hi-jet application system (PB/MDF), a refiner (MDF), a mat spray (PB/MDF—end of forming line), a moisture control (blended with water), an extruder, or combinations thereof.

In another embodiment, the lignosulfonate or the kraft lignin is in solid powder form, liquid form or combinations thereof.

In some embodiments, the alkaline compound can include ammonia, an amine, a Group I metal hydroxide, a Group II metal hydroxide, Group I metal carbonate, a Group II metal carbonate, or combinations thereof.

In other embodiments, the additive is selected from the group consisting of catalyst, filler, buffer, base, tackifier, wax, water, scavenger, boron compound, phosphate, halogen compound, nitrogen compound, and mixtures thereof.

In one embodiment, one or more additives are present.

Figure 12:
FIG. 12 demonstrates that the blended furnish comprising the one or more lignosulfonate salt may have a distinct color that is noticeably different from the color of pure UF/MUF resins.

In certain embodiments, the blended furnish can include the one or more lignosulfonate salt may have a distinct color that is noticeably different from the color of pure UF/MUF resins. FIG. 12 demonstrates that the blended furnish comprising the one or more lignosulfonate salt may have a distinct color that is noticeably different from the color of pure UF/MUF resins.

In other embodiments, the lignocellulose substrate can include a granulated lignocellulose substrate, a flake lignocellulose substrate, a fibrous lignocellulose substrate or combinations thereof.

In further embodiments, the blended furnish can include about 0.0 wt. % to about 50 wt. % of the UF resin or the MUF resin; about 0.1 wt. % to about 30 wt. % of the lignosulfonate or the kraft lignin; about 0.0 wt. % to about 1 wt. % of the alkaline compound; and about 0.0 wt. % to about 40 wt. % of the additive, wherein each weight percent is based on the total weight of the blended furnish.

In certain embodiments, the lignosulfonate or the kraft lignin is mixed with a catalyst, a filler, a buffer, a base, a tackifier, wax, water, scavenger, a boron compound, a phosphate, a halogen compound, a nitrogen compound, and mixtures thereof at a resin manufacturer's facility, at a lignosulfonate or kraft lignin supplier's facility, a third party vendor site, in a wood based composite manufacturer's storage tank, in a railcar, truck, or other transportation vehicle or combinations thereof.

III. Methods of Making Blended Furnish

The invention provides methods of making and using a blended furnish.

In some embodiments, a method for preparing a blended furnish, can include adding a plurality of substrates; mixing a urea-formaldehyde (UF) resin or a melamine-urea-formaldehyde (MUF) resin optionally with an amine and water at a pH of 5-11, preferably 6-10; optionally adding one or more additives; adding a lignosulfonate salt or a kraft lignin; optionally adding one or more additives to form the blended furnish, wherein the blended furnish has a buffer capacity of 2-200 mL of 0.1 N HCl by the Acid Titration Value (ATV) Method using 20 grams of blended furnish for a period of time up to 20 days.

In certain embodiments, the lignosulfonate is selected from the group consisting of calcium lignosulfonate, magnesium lignosulfonate, potassium lignosulfonate, chrome lignosulfonate, ammonium lignosulfonate, sodium lignosulfonate and mixtures thereof.

In other embodiments, a method for preparing a blended furnish, can include adding a plurality of substrates; mixing a urea-formaldehyde (UF) resin or a melamine-urea-formaldehyde (MUF) resin, a lignosulfonate salt or a kraft lignin optionally with an amine and water at a pH of 5-11, preferably 6-10; optionally adding one or more additives to form the blended furnish, wherein the blended furnish has a buffer capacity of 2-200 mL of 0.1 N HCl by the Acid Titration Value (ATV) Method using 20 grams of blended furnish for a period of time up to 20 days.

In further embodiments, the lignosulfonate is selected from the group consisting of calcium lignosulfonate, magnesium lignosulfonate, potassium lignosulfonate, chrome lignosulfonate, ammonium lignosulfonate, sodium lignosulfonate and mixtures thereof.

In some embodiments, a method for preparing a blended furnish, can include adding a plurality of substrates; mixing a lignosulfonate salt or a kraft lignin with the substrates; adding a urea-formaldehyde (UF) resin or a melamine-urea-formaldehyde (MUF) resin optionally with an amine and water at a pH of 5-11, preferably 6-10; optionally adding one or more additives to form the blended furnish, wherein the blended furnish has a buffer capacity of 2-200 mL of 0.1 N HCl by the Acid Titration Value (ATV) Method using 20 grams of blended furnish for a period of time up to 20 days.

In other embodiments, the lignosulfonate is selected from the group consisting of calcium lignosulfonate, magnesium lignosulfonate, potassium lignosulfonate, chrome lignosulfonate, ammonium lignosulfonate, sodium lignosulfonate and mixtures thereof.

IV. Composite Product

The invention provides a composite product using a blended furnish.

In some embodiments a composite product, can include a plurality of substrates; and at least partially cured blended furnish, wherein the blended furnish, prior to curing, can include a urea-formaldehyde (UF) resin or a melamine-urea-formaldehyde (MUF) resin; a lignosulfonate or a kraft lignin; an alkaline compound; and optionally one or more additives; wherein the blended furnish has a buffer capacity of 2-200 mL of 0.1 N HCl by the Acid Titration Value (ATV) Method using 20 grams of blended furnish for a period of time up to 20 days.

In other embodiments, the composite product can include plywood, oriented strand board, oriented strand lumber, laminated veneer lumber, laminated veneer timber, laminated veneer boards, particleboard, fiberboard, chipboard, flakeboard, high density fiberboard, medium density fiberboard, waferboard, hardwood, softwood plywood, veneer timber, parallel standard lumber, oriented stranded lumber, or combinations thereof.

V. Resin System

The present disclosure is directed to ready-to-use resin systems, applications containing the resin system, and methods of preparing the resin systems. The resin systems of the present invention contain urea and formaldehyde, and optionally melamine. The present inventors have found that a partial to total replacement of melamine in melamine-urea-formaldehyde (MUF) resin systems with an equivalent weight % of a lignosulfonate, can make a resin which is more environmentally friendly, while maintaining the same resin performance. This is especially significant since lignosulfonates are an eco-friendly component.

The resin system of the present invention may include a UF resin or MUF resin, prepared by:

a urea-formaldehyde (UF) resin or melamine-urea-formaldehyde (MUF) resin, prepared by:

mixing a first set of components comprising one or more urea compounds and one or more formaldehyde compounds and optionally one or more melamine compounds, optionally heating while mixing for at least one minute to form a first reaction product having an initial molar ratio (IMR) of total moles of the one or more formaldehyde compounds to moles of the one or more urea compounds plus, if present, the one or more melamine compounds of from about 1.4:1 to 5:1, or about 1.4:1 to 3:1, or about 2, mixing the first reaction product with a second set of components comprising one or more urea compounds and a buffering and stabilizing agent and optionally one or more melamine compounds, optionally heating while mixing to form a UF resin or MUF resin, wherein the UF resin or MUF resin has a molar ratio (MR) of total moles formaldehyde to total moles urea plus, if present, the one or more melamine compounds of from about 0.25:1 to about 2.50:1, or from about 0.25:1 to about 1.5:1, and if the pH of the UF resin or MUF resin is not 6.5 to about 10.0, or from about 8.0 to about 10.0, or from about 8.0 to about 9.0 then one or more alkaline compounds may be mixed with the UF resin or MUF resin until the pH of the UF resin or MUF resin is 6.5 to about 10.0, or from about 8.0 to about 10.0, or from about 8.0 to about 9.0 to form the resin system, wherein one or more lignosulfonate compounds are included with the first set of components and/or with the second set of components in an amount of from about 0.1 wt. % to about 30 wt. %, or from about 1.0 wt. % to about 20 wt. %, or from about 1.0 wt. % to about 10 wt. %, based on a total weight of the resin system, about 0.0 wt. % to about 40 wt. % of water, based on the total weight of the resin system, and wherein the resin system has a buffer capacity of 2 to 400 mL, or greater than 5 to 150 mL, preferably 20 to 60 mL of 0.1 N HCl by the ATV Method for a period of time of at least about 20 days at 25° C.

The UF or MUF resin is typically prepared in two steps. In the first step, a first set of components, comprising one or more urea compounds and one or more formaldehyde compounds, and optionally one or more melamine compounds, are heated while mixing for at least one minute to form a first reaction product. Preferably, the first set of components is heated to a temperature of from about 75° C. to about 100° C., or from about 80° C. to about 95° C. or from about 85° C. to about 90° C.

The first step of preparing the UF or MUF resin is typically made using a molar excess of formaldehyde. The one or more urea compounds, the one or more formaldehyde compounds, and if present, the one or more melamine compounds are present in amount such that the first reaction product has a molar ratio (IMR) of total moles of the one or more formaldehyde compounds to moles of the one or more urea compounds plus, if present, the one or more melamine compounds of from about 1.4:1 to 5:1, or about 1.4:1 to 3:1, or about 2. The one or more urea compounds in the first set of components may be present in an amount of from about 5 wt. % to about 35 wt. %, or from about 10 wt. % to about 30 wt. %, or from about 15 wt. % to about 25 wt. %, based on the total weight of the resin system. In some embodiments, the one or more melamine compounds in the first set of compounds may include about 0.1 wt. % to about 20 wt. %, or about 1.0 wt. % to about 15 wt. %, or about 2.0 wt. % to about 5.0 wt. %, or more than 2.0 wt. % to about 5.0 wt. % of, wherein each weight percent is based on the total weight of the resin system. The total formaldehyde present in the resin system is from about 5 wt. % to about 40 wt. %, or from about 10 wt. % to about 35 wt. %, or from about 15 wt. % to about 30 wt. %, based on the total weight of the resin system.

In the second step, the first reaction product is mixed with a second set of components comprising a urea compound, a buffering and stabilizing agent. These components are all mixed and can be heated to a temperature of from about 20° C. to about 60° C., or from about 25° C. to about 55° C., or from about 30° C. to about 50° C., to form the UF or MUF resin.

Pure UF/MUF resins are typically clear or white. Sometimes there will be a yellowish tint that is due to iron contamination and oxidation of additives that go into the resin. When lignosulfonate is added to the resin, the color shift is obvious. There are different grades of lignosulfonate and their color changes depending on region, wood species, and lignin content. In each of the foregoing embodiments, the resin system comprising the one or more lignosulfonate has a color that is noticeably different than the color of pure UF/MUF resins. Preferably, within 72 hours following formation of the resin system, 1 liter of the resin system may have an orange yellow, red, tan or brown color; or wherein within 72 hours following formation of the resin system, the resin system may have a color which is in the range of 4 to 40+using the official AIH SRM (Standard Research Method) Number Scale for the color of beer.

The one or more urea compounds and optionally the one or more melamine compounds of the second set of components are present in an amount such that the UF or MUF resin has a molar ratio (MR) of total moles the one or more formaldehyde compounds to total moles of the one or more urea compounds and, if present, the one or more melamine compounds of from about 0.25:1 to about 2.50:1, or from about 0.25:1 to about 1.5:1. In some embodiments, the one or more urea compounds in the second set of compounds may be present in an amount of from about 15 wt. % to about 40 wt. %, or from about 20 wt. %, to about 37 wt. %, or from about 25 wt. % to about 35 wt. %, based on the total weight of the resin system. In some embodiments, the one or more melamine compounds in the second set of compounds may include about 0.1 wt. % to about 20 wt. %, or about 1.0 wt. % to about 15 wt. %, or about 2.0 wt. % to about 5.0 wt. %, or more than 2.0 wt. % to about 5.0 wt. % of, wherein each weight percent is based on the total weight of the resin system.

The purpose of the last addition of urea, is to scavenge excess free-formaldehyde. This is advantageous as this ensures the resin system meets the standard requirements for formaldehyde emissions. In some embodiments, during the second step, the one or more urea compounds, and if present, the one or more melamine compounds of the second set of components is allowed to dissolve, for about 5 minutes to about 1 hour, or about 30 minutes. Once the one or more urea compounds and, if present, the one or more melamine compounds is dissolved, the buffering and stabilizing agent may be added to the UF or MUF resin. The buffering and stabilizing agent may each independently be present in an amount of from about 0.0 wt. % to about 20 wt. %, or from about 0.001 wt. % to about 3 wt. %, or from about 0.01 wt. % to about 2.0 wt. %, based on a total weight of the resin system.

Following this, an alkaline compound or acidic compound may be added to the UF or MUF resin and mixed to adjust the pH of the resin. Preferably, the alkaline compound or acidic compound is added until a pH of about 6.5 to about 10.0, or from about 8.0 to about 10.0, or from about 8.0 to about 9.0 is achieved.

The alkaline compound may be a strong base. The incorporation of the alkaline compounds assists in the overall stability of the resin, as the same resin system devoid of the alkaline compound results in gelling. As more alkaline compound is added, the pH increases, and thus, produces a more stable resin system.

The % non-volatiles in the resin system can range from about 40 to about 80, or about 50 to about 75 as measured via NATM-A12.

The one or more urea compounds that can be used in the first or second set of components include but are not limited to dimethylol urea, methylated dimethylol urea, urea-resorcinol, and mixtures thereof.

The one or more formaldehyde compound that can be used in the first set of components include, but are not limited to formaldehyde, paraformaldehyde, trioxane, acetaldehyde, glyoxal, glutaraldehyde, polyoxymethylene, propionaldehyde, isobutyraldehyde, benzaldehyde, acrolein, crotonaldehyde, furfural, 5-hydromethylfural and combinations thereof. Formaldehyde is the most commonly used. As the aldehyde, formalin in the form of an aqueous solution is optimal, but forms, such as paraformaldehyde, benzaldehyde, trioxane, and tetraoxane can be used. It can be used by replacing with aldehyde or furfuryl alcohol.

The one or more melamine compound which is optionally used in the first and/or second set of components include, but are not limited to melamine, methylol melamine, methylated methylol melamine, imino melamine and mixtures thereof. In some embodiments, the one or more melamine compounds can be added in up to a 1:1 molar ratio with the total moles of the one or more urea compounds in the resin system, or the one or more melamine compounds can be added in 0.001:1 to a 0.5:1 molar ratio with the total moles of the one or more urea compounds in the resin system, or the one or more melamine compounds can be added in a 0.01:1 to 0.25:1 molar ratio with the total moles of the one or more urea compounds in the resin system.

The alkaline compounds may include, but are not limited to, one or more Group I or II metal hydroxides, one or more Group I or II metal carbonates, ammonia, one or more amines, or mixtures thereof. Suitable hydroxides may include, but are not limited to, sodium hydroxide, potassium hydroxide, ammonium hydroxide, (e.g. aqueous ammonia), lithium hydroxide, cesium hydroxide, or any mixture thereof. Illustrative carbonate, lithium carbonate, ammonium carbonate, or any mixture thereof. Illustrative amines can include, but are not limited to, trimethylamine, triethylamine, triethanolamine, diisopropylethylamine (Hunig's base), pyridine, 4-dimethylaminopyridine (DMAP), 1,4-diazabicyclo[2.2.2]octane (DABCO), or any mixture thereof. Preferably, the alkaline compound may be selected from sodium hydroxide, potassium hydroxide, caustic soda, ammonium hydroxide, or any mixtures thereof. Immediately following the formation of the UF or MUF resin the alkaline compound is mixed with the UF or MUF resin to form the resin system.

As discussed above, an amount of alkaline compound may be added to the first set of components to ensure the pH is within a range of 4-10, or an alkaline compound may be added to the second set of components to ensure the pH is within a range of 6.5 to about 10.0, or from about 8.0 to about 10.0, or from about 8.0 to about 9.0 when forming the resin system to secure stability and buffer capacity. Nevertheless, after a certain duration of time after the formation of the resin system, an additional amount of alkaline compound may optionally be added to improve the stability. The duration of time may be from about 1 to about 72 hours, or from about 2 hours to about 60 hours, or about 24 to 48 hours after the formation of the resin system. The amount of the alkaline compound which may be added to the resin system until a pH of from about 6.5 to about 10.0, or from about 8.0 to about 10.0, or from about 8.0 to about 9.0 is achieved.

The acidic compounds may include, but are not limited to, chloric acid, hydrobromic acid, hydrochloric acid, hydroiodic acid, nitric acid, perchloric acid, sulfuric acid, sulfurous acid, phosphoric acid, acetic acid, formic acid, benzoic acid, oxalic acid, hydrogen sulfate ion, nitrous acid, hydrofluoric acid, carbonic acid, methanoic acid or any mixtures thereof.

As discussed above, an amount of acidic compound may be added to the second set of components to ensure the pH is within a range of 6.5 to about 10.0, or from about 8.0 to about 10.0, or from about 8.0 to about 9.0 when forming the resin system to secure stability and buffer capacity.

The UF resin further comprises a lignosulfonate which may be included in either the first set of components or with the second set of components, in an amount of from about 0.1 wt. % to about 30 wt. %, or about 1.0 wt. % to about 15 wt. %, or about 2.0 wt. % to about 5.0 wt. %, or more than 2.0 wt. % to about 5.0 wt. %, based on the total weight of the resin system.

In embodiments where the lignosulfonate is included in the first set of components, the lignosulfonate, the one or more urea compounds, total formaldehyde and if present, the one or more melamine compounds of the first set of components, are mixed and heated together. In embodiments where the lignosulfonate is included in the second set of components, the lignosulfonate is added after the one or more urea compounds, and if present, the one or more melamine compounds of the second set of components is dissolved and the buffering and stabilizing agent is added but prior to the addition of the alkaline compound.

Lignosulfonate may be extracted, separated, or otherwise recovered from wood, plant, and/or vegetable matter using any of a number of well-established processes. For example, in the pulp and paper industry, lignin-containing materials such as wood, straw, corn stalks, bagasse, and other vegetable and plant tissues can be processed to recover the cellulose pulp via the known sulfite process. The residual pulping liquors that include the lignin as a byproduct can be a source of lignin. The chemical structure of lignin can vary, and the variation can depend, at least in part, on the particular plant from which the lignin is recovered from, location the plant was grown, and/or on the particular method used in recovery or isolation of the lignin from the plant and/or vegetable matter. Lignin can include active groups, such as active hydrogens and/or phenolic hydroxyl groups through which crosslinking or bridging can be effected.

One process for recovering lignin can include the process commonly referred to as the organosolv process. The organosolv process uses an organic solvent to solubilize lignin and hemicelluloses. The organosolv process can include contacting lignocellulose material, e.g., wood chips or particles, with an aqueous organic solvent at a temperature of about 130° C., about 140° C., or about 150° C. to about 200° C., about 220° C., or about 230° C. The lignin can break down by hydrolytic cleavage of alpha aryl-ether links into fragments that can be solubilized in the solvent system. Illustrative solvents can include, but are not limited to, acetone, methanol, ethanol, butanol, ethylene glycol, formic acid, acetic acid, or any mixture thereof. The aqueous organic solvent can have a concentration of the solvent in water of about 30 wt %, about 40 wt % or about 50 wt % to about 70 wt %, about 80 wt %, or about 90 wt %.

Since the lignin separated from the plant can be chemically altered from that found in the plant, the term "lignin," can also refer to lignin products obtained upon separation from the cellulose or recovered from the plant matter. For example, in a sulfite pulping process, the lignocellulose material can be digested with a bisulfite or sulfite resulting in the at least partial sulfonation of the lignin. As such, the lignin can optionally be subjected to further cleavage and/or other modifications such as alkaline treatment or reaction with other constituents to decrease the sulfonate or sulfur content and/or increase the active groups.

The liquors form which the lignin can be recovered can also include one or more other constituents in addition to the lignin. For example, in the sulfite pulping process, the spent sulfite liquor can include lignosulfonates that can be present as salts of cations, such as magnesium, calcium, ammonium, sodium, potassium and/or other cations. The spent sulfite liquor solids can include about 40 wt. % to about 65 wt. % lignosulfonates with the remainder being carbohydrates and other organic and inorganic constituents dissolved in the liquor.

Figure 8:
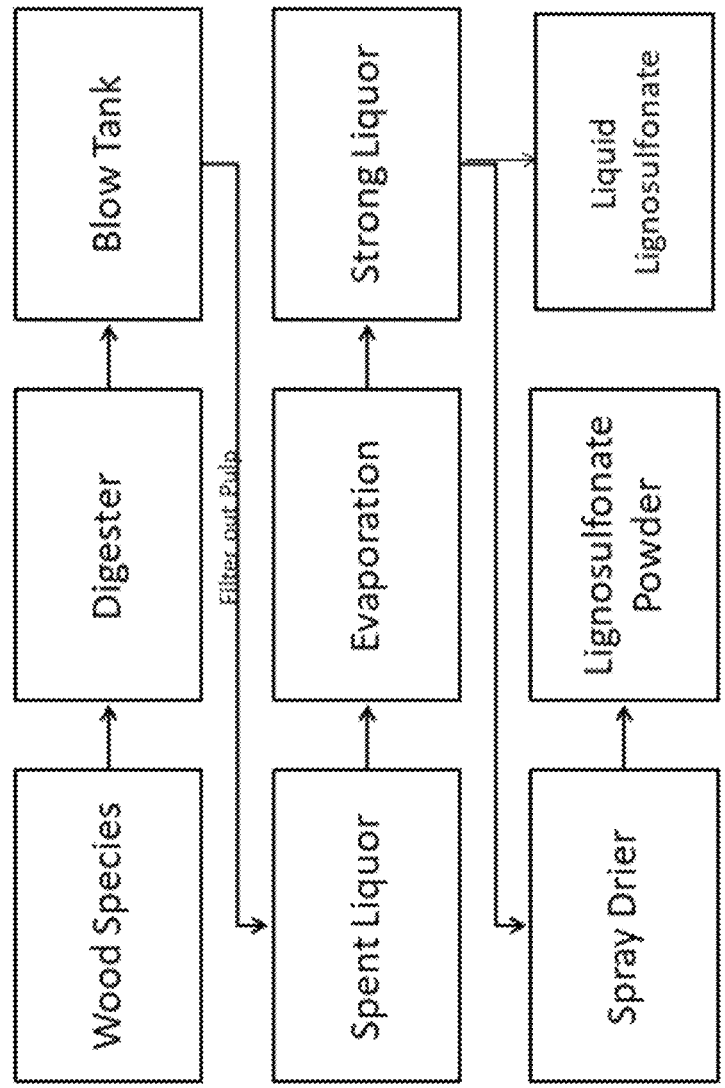
FIG. 8 shows the process of producing lignosulfonates.
Figure 9:
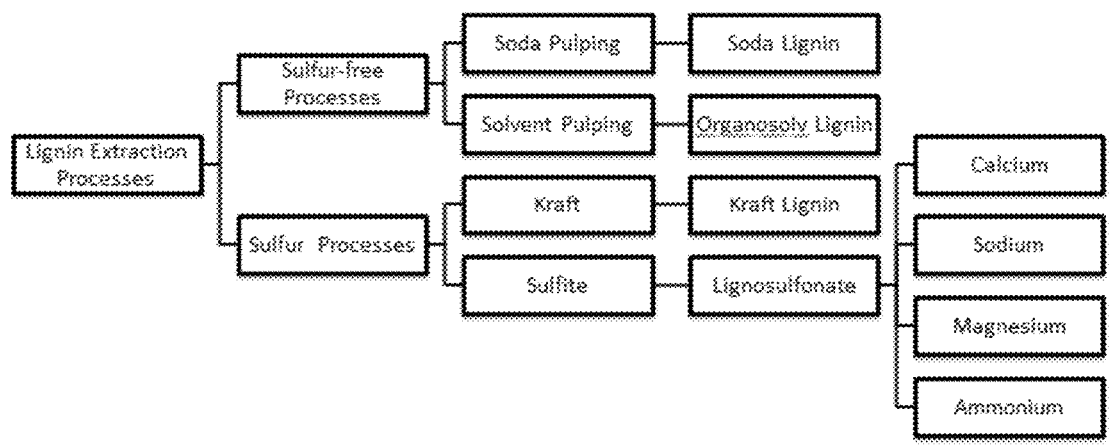
FIG. 9 shows the differences between lignosulfonates and other lignin species.
Figure 10:
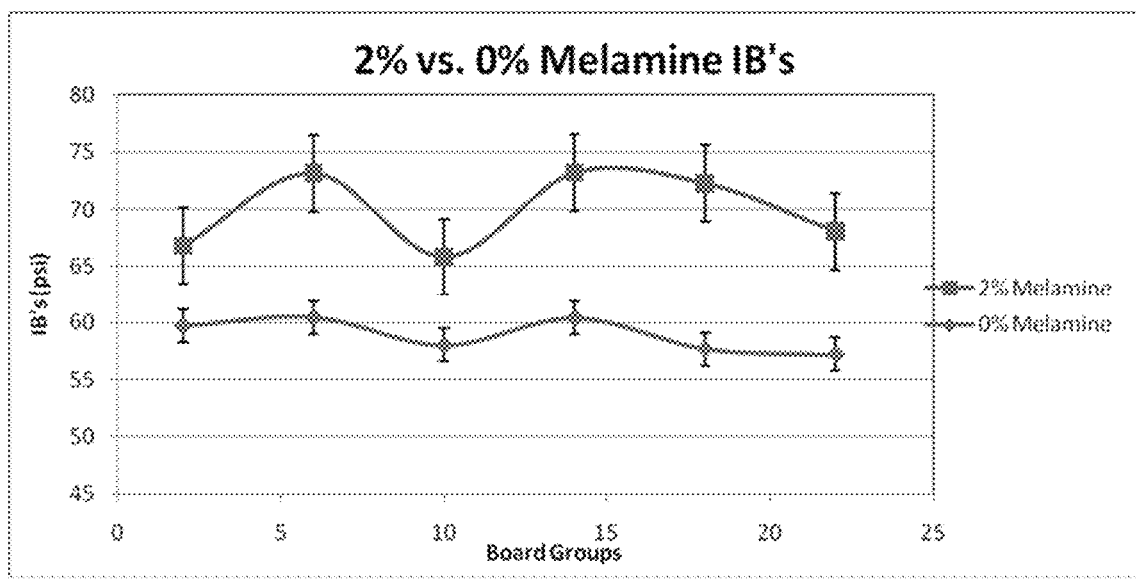
FIG. 10 shows a chart (that is not part of the prior art) comparing the measured Internal Bond strength of a resin prepared from urea and formaldehyde (0% melamine) and a resin prepared from melamine, urea, and formaldehyde (2% melamine).

Preferably, the lignin employed in the present invention is prepared from the sulfite pulping process to produce a lignosulfonate. This process is illustrated in FIG. 8. Preferably, the resin systems do not include lignin species, such as kraft lignin. FIG. 9 demonstrates the differences in the pulping process for preparing lignosulfonates compared to lignin species.

Suitable examples of lignosulfonates may be selected from calcium lignosulfonate, magnesium lignosulfonate, ammonium lignosulfonate, or sodium lignosulfonate, or preferably, ammonium lignosulfonate or sodium lignosulfonate. The lignosulfonates of the resin system may have a weight average molecular weight of from about 1,000 daltons to about 100,000 daltons, as measured by gel permeation chromatograph ("GPC"). For example, the lignosulfonate may have a weight average molecular weight of from about 5,000 daltons to about 80,000 daltons, or from about 15,000 to about 80,000 daltons, or from about 30,000 to about 70,000 daltons, or from about 50,000 to about 70,000 daltons, as measured by gel permeation chromatograph ("GPC"). The lignosulfonates of the resin system may have a number average molecular weight of from about 50 daltons to about 25,000 daltons, or from about 5,000 daltons to about 25,000 daltons, or from about 12,000 daltons to about 20,000 daltons, as measured by gel permeation chromatograph ("GPC"). The lignosulfonates of the resin system may have a polydispersity (Mw/Mn) of from about 1 to about 100, or from greater than 1 to about 20, or from about 2 to 8. Preferably, lignin species, such as kraft lignin is not added to the resin system.

The lignosulfonates of the present invention may include from about 1 wt. % to about 20 wt. % sulfur, or from about 1.5 wt. % to about 15 wt. % sulfur, or from about 3 wt. % to about 10 wt. % sulfur, based on the weight of the lignosulfonate.

The buffering and stabilizing agent may be employed to stabilize the pH of a solution, i.e. resist changes in pH when acidic or alkaline materials are added to a solution. Suitable buffering and stabilizing agents may be selected from glycine hydrochloride, sodium acetate, phosphate buffered saline (PBS) (including mono- and dihydrogen phosphate slats), citrate buffer (citric acid and sodium citrate), phosphate-citrate buffer, tris(hydroxymethyl)aminomethane (tris), carbonate buffers, borate buffers, borate buffered saline, magnesium chloride, potassium chloride, zinc chloride, hydrochloric acid, sodium hydroxide, edetate disodium, various substituted amines (alkyl amines, aliphatic and aromatic diamines and triamines) and their salts, sodium formate, sodium sulfate, phosphate salts (potassium mono-, di- and tri-basic), and combinations thereof.

The buffering and stabilizing agent can be present in an amount from 0.001 wt. % to 20 wt. %, or 0.001 wt. % to 2 wt. %, or 0.01 wt. % to 1.0 wt. %, based on the total weight of the resin system.

The UF or MUF resin, excluding the lignosulfonate, may have a number average molecular weight (Mn) of from about 300 daltons to about 20,000 daltons, or from about 1,000 daltons to 10,000 daltons, or from about 1,500 daltons to about 9,000 daltons, as measured by gel permeation chromatograph ("GPC"). The UF or MUF resin, excluding the lignosulfonate, may have a weight average molecular weight of from about 30,000 to about 200,000 daltons, as measured by gel permeation chromatograph ("GPC"). The UF or MUF resin, excluding the lignosulfonate, may have a polydispersity (Mw/Mn) of from about 10 to about 100.

The resin system of the present invention has a suitable buffer capacity of 2-400 mL, or greater than 5 to 150 mL, preferably 20-60 mL of 0.1 N HCl by the ATV Method for a period of time of at least about 20 days at 25° C. Well known MUF resin systems cannot be simply modified to replace some or all of the melamine with lignosulfonate to achieve compositions that are of the same quality, thus other components, such as a buffering and stabilizing agent and alkaline compound are preferred. These components ensure that the resin system achieve the appropriate buffer capacity. Too low of a buffer capacity results in an unstable material that will cure to early and dry out, but too high of a buffer capacity cures too slowly in the press, losing efficacy of the material.

The viscosity of the resin system may widely vary depending on the amount of time which has passed from the time of manufacture. For example, the kinematic viscosity of the resin system may range from about 100 to about 1,500 cSt, or about 100 to about 1,000 cSt, or about 100 to about 600 cSt at a temperature of about 25° C., as measured by the Gardner-Holdt viscosity method, for a period of time of at least about 20 days at 25° C., and wherein the period of time starts when the resin system is initially produced, and the resin system has may have a fast cure rate so to achieve an improvement in internal bond strength when compared to the Control resin system of up to 20%, preferably 10% to 20% at <7.0 press factor at 350° F. platen temperature. When measured at full cure at <7.0 press factor at 350° F. platen temperature, the IB is at least as good for the inventive resin as compared to the comparative resin. The control resin is Comparative Example B, discussed below.

The Gardner-Holdt (Bubble) viscosity method allows for quick determination of the kinematic viscosity of liquids such as resins and varnishes. Certified tubes from Gardner may be used for the measurement of the viscosity at room temperature, approximately 25° C. The Gardner-Holdt (Bubble) viscosity method may include a scale which ranges from A4-Z6 which corresponds to a range of kinematic viscosity of 10 cSt to approximately 15,000 cSt, at 25° C., as measured by a Brookfield viscometer with a small sample adapter such as a 10 mL adapter and the appropriate spindle to maximize torque such as a spindle no. 31. Suitable values for the viscosity of the resin system may include D-U, or preferably, H-S, via the Gardner-Holdt scale. Table 1 shows the Gardner-Holdt (Bubble) viscosity scale with their corresponding kinematic viscosities, as measured by a Brookfield viscometer with a 10 mL adapter and spindle no. 31:

| cSt @ 25° C. | Gardner-Holdt scale |
| --- | --- |
| 100 | D |
| 120 | E |
| 140 | F |
| 160 | G |
| 200 | H |
| 220 | I |
| 240 | J |
| 280 | K |
| 300 | L |
| 320 | M |

-continued

| cSt @ 25° C. | Gardner-Holdt scale |
|---|---|
| 340 | N |
| 360 | O |
| 400 | P |
| 440 | Q |
| 460 | R |
| 500 | S |
| 550 | T |
| 600 | U |

The resin system may also optionally include an amount of melamine. The melamine may be present in an amount of from about 0.0 wt. % to about 30 wt. % or from about 0.0 wt. % to about 25 wt. %, or from about 0.0 wt. % to about 20 wt. % or from about 0.1 wt. % to about 15 wt. %, based on the total weight of the resin system. In some embodiments, no melamine is added to the resin composition.

In some embodiments, the UF or MUF resin may optionally be prepared with water. The water may be present in the resin system in an amount to provide from about 0.0 wt. % to about 40 wt. %, or from about 0.0 wt. % to about 9 wt. %, or from about 0.01 wt. % to about 2 wt. %, based on the total weight of the resin system. In embodiments where water is present, the water is included with either the first set of components or with the second set of components. The resin systems as disclosed herein employ low levels of water compared to well-known urea-formaldehyde resins in the art. Typically, water is included to reduce the viscosity of a resin system and to help with heat transfer from the surface of the product during the curing step. However, the combination of components in certain ratios of the present disclosure allows for resin systems capable of achieving a suitable viscosity, without the addition of large quantities of water.

The resin system may optionally include additional additives, such as primary, secondary, and tertiary amines, for example, triethanolamine, organic and inorganic salts, and metal hydroxides.

The resin systems discussed above may be used as adhesives, which then, may be used to make composite products. For example, the present invention may also relate to blended furnishes including a plurality of granulated, or fibrous lignocellulose substrates and an adhesive comprising the resins systems.

The adhesives of the present invention may include additional components, such as fillers, extenders, organic and inorganic salts, organic polyols and carbohydrate-based additives, acrylics, and organic proteins.

Suitable fillers can include, but are not limited to, nut shell media, corn media or corn cob media, furfural residues, or any mixture thereof. The nut shell media can be or include whole, broken, chopped, crushed, milled, and/or group shells from one or more nuts and/or seeds. Suitable net shell media can include, but is not limited to, almond, walnut, pecan, chestnut, hickory, cashew, peanut, macadamia, or any mixture thereof. The corn media can be or include broken, chopped, crushed, or ground corn cobs, corn stalks, or other corn derived products, or any mixture thereof. Corn media can also include furfural residue from corn cobs, corn stalks, or other corn derived products. An illustrative corn derived produce can include, but is not limited to, a cellulose byproduct derived from the manufacture of furfural, or furfural residues, including floral and furfural-derived compounds, can also come from oat, wheat, wheat bran, barely, wood particles, sawdust, and/or other plant-based products.

Illustrative seed shells (including fruit pits), can include, but are not limited to, the seed shells or pits of fruit, e.g. plum, peach, cherry, apricot, olive, mango, olive, jackfruit, guava, custard apples, pomegranates, pumpkins, watermelon, ground or crushed seed shells of other plants such as maize, wheat, rice jowar, sunflowers, or the like, or any mixture thereof. Other examples of suitable fillers include, but are not limited to, wheat shell, corn husk, peanut shell, or any combination thereof.

Suitable extenders can include, but are not limited to, one or more flours, one or more polysaccharides, one or more starches, one or more polysaccharide starches, or any mixture thereof. Flours can be ground or milled to a variety of different granular sizes, such as fine, ultra-fine, or very ultra-fine granular sizes. Illustrative flours can include, but are not limited to, wheat flour, corn flour, soy flour, oat flour, other grain flours, nut or seed flour (e.g., almond, walnut, pecan, cashew, or peanut), brands thereof, starches thereof, or any mixture thereof. In some examples, the extender can be or include corn flours or corn starches, such as NCS-83, NCS-74, and 4501 flours, commercially available from Didion Milling Company, Inc., Sun Prairie, WI. In other examples, the extender can be or include wheat flours, wheat starches, and/or wheat derived protein-starch composition. Illustrative polysaccharides can include, but are not limited to, starch, cellulose, gums, such as guar and xanthan, alginates, pectin, gellan, or any mixture thereof. Suitable polysaccharide starches can include, for example maize or corn, native corn starch (NCS), waxy maize, high amylose maize, potato, tapioca, wheat starch, or any mixture thereof. Other starches, such as genetically engineered starches, can include high amylose potato starches, potato amylopectin starches, or any mixture thereof.

In one or more embodiments, the method for making a composite lignocellulosic product can include contacting a plurality of lignocellulose substrates and a partially cured resin system, as disclosed above. The resin system can be at least partially cured, e.g. by heating, to produce the composite product. The composite lignocellulosic product can also include, but is not limited to, the extender, the filler, or any mixture thereof.

Heating the resin system can cause or promote the at least partial curing the of the resin system to produce the composite product. As used herein, the terms "curing", "cured," "at least partially curing," "at least partially cured', and similar terms are intended to refer to the structural and/or morphological change that occurs in the mixture, such as by covalent chemical reaction (crosslinking), ionic interaction or clustering, phase transformation or inversion, and/or hydrogen bonding when it is subjected to conditions sufficient, i.e. sufficiently heated, to cause the properties of a flexible, porous substrate, such as a nonwoven mat or blanket of lignocellulose substrates, and/or rigid or semi-rigid substrate, such as a wood or other lignocellulose containing board or sheet, to which an effective amount of the adhesive has been applied, to be altered.

In one or more embodiments, one or more additives can be combined with the adhesive and/or any one or more components of the adhesive to produce the composite product.

Illustrative additives can include, but are not limited to, waxes and/or other hydrophobic additives, release agents, dyes, fire retardants, formaldehyde scavengers, biocides, or any mixture thereof. In some examples, the mixtures, compositions, and products, including, but not limited to, the adhesive, the composite product, can be produced by a process for homogenizing, agitating, mixing, blending, or otherwise combining process, such as with homogenization, ultrasonication, colloid milling, microfluidic mixing as a method of homogenization, or other similar processes.

Illustrative composite products can include, but are not limited to, plywood (e.g., hardwood plywood and/or softwood plywood), oriented strand board ("OSB"), laminated veneer lumber ("LVL"), laminated veneer boards ("LVB"), engineered wood flooring, particleboard ("PB"), fiberboard (e.g., medium density fiberboard ("MDF") and/or high density fiberboard ("HDF")), or other wood and non-wood products, preferably, the composite product is a particleboard or medium density fiberboard.

Illustrative products are not necessarily primarily wood based and can include composites comprising the inventive resin system and glass mat and/or abrasives. The inventive resin system can be used in glass fiber nonwoven systems or as an impregnation resin in one or more layers of an overlay.

In some examples, the method can also include applying the adhesive between two or more wood veneers or wood sheets to produce the composite product (e.g., plywood, OSB, LVL, LVB, or engineered wood flooring). The plurality of lignocellulose substrates can be or include wood veneers or wood sheets and the adhesive can be disposed between wood veneers or wood sheets. In other examples, the method can also include forming a lignocellulose adhesive mixture or "resinated furnish" by combining the plurality of lignocellulose substrates and the adhesive and heating the adhesive to produce the composite product (e.g., particleboard, MDF, or HDF).

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

To demonstrate if replacing melamine with an ecofriendly lignosulfonate in melamine-urea-formaldehyde resin provides comparable properties, five different resin systems are tested for internal bond strength, pH stability, and buffer capacity.

Inventive Example 1—UF Resin with Lignosulfonate (Post-Add)

In a vessel, a first set of components are mixed. 40-50 parts formaldehyde (52.5% solution) are combined with 0.01-0.1 parts of triethanolamine, and 0.5-1.5 parts water. The temperature is maintained within 50° C. to 80° C. and the pH is maintained between 8-10 with acid or base as necessary. 20-30 parts of urea are added and the temperature is increased within 80° C. to 110° C. and the pH is maintained between 4-8 with acid or base as necessary. The second set of components are then added. The temperature is decreased to be within 40° C. to 80° C. and 25-50 parts of urea, 1.0-5.0 parts of a first lignosulfonate salt and 0.01-0.1 parts of one or more buffering and stabilizing agents are mixed in. The final pH is maintained between 8-10 with acid or base as necessary.

Inventive Example 2—UF Resin with Lignosulfonate (Post-Add)

The process described above for Inventive Example 1 is essentially repeated except that a different lignosulfonate salt is used.

Inventive Example 3—UF Resin with Lignosulfonate (Up Front)

In a vessel, a first set of components are mixed. 40-50 parts formaldehyde (52.5% solution) are combined with 0.01-0.1 parts of triethanolamine, 0.5-1.5 part water and 1-5 parts of the same lignosulfonate salt used in Inventive Example 2. The temperature is maintained within 50° C. to 80° C. and the pH is maintained between 8-10 with acid or base as necessary. 20-30 parts of urea are added and the temperature is increased within 80° C. to 110° C. and the pH is maintained between 4-8 with acid or base as necessary. The second set of components are then added. The temperature is decreased to be within 40° C. to 80° C. and 25-50 parts of urea and 0.01-0.1 parts of one or more buffering and stabilizing agents are mixed in. The final pH is maintained between 8-10 with acid or base as necessary.

Inventive Example 4—MUF Resin with Lignosulfonate (Up Front)

In a vessel, a first set of components are mixed. 40-50 parts formaldehyde (52.5% solution) are combined with 0.01-0.1 parts of triethanolamine, 0.5-1.5 part water, 1-5 parts of melamine and 1-5 parts of lignosulfonate salt. The temperature is maintained within 50° C. to 80° C. and the pH is maintained between 8-10 with acid or base as necessary. 20-30 parts of urea are added and the temperature is increased within 80° C. to 110° C. and the pH is maintained between 4-8 with acid or base as necessary. The second set of components are then added. The temperature is decreased to be within 40° C. to 80° C. and 25-50 parts of urea and 0.01-0.1 parts of one or more buffering and stabilizing agents are mixed in. The final pH is maintained between 8-10 with acid or base as necessary.

Comparative Example A—MUF Resin without Lignosulfonate

The process described above for Inventive Example 3 is essentially repeated except that the 1-5 parts of lignosulfonate is replaced with 1-5 parts of melamine. In this Comparative Example A, no lignosulfonate is used.

Comparative Example B-UF Resin without Melamine or Lignosulfonate

The process described above for Inventive Example 2 is essentially repeated except that no lignosulfonate is used. In this Comparative Example B, no lignosulfonate or melamine is used.

Samples were tested and the following results were obtained.

TABLE 1

|  | Comparative Example A | Comparative Example B | Inventive Example 1 | Inventive Example 2 | Inventive Example 3 |
| --- | --- | --- | --- | --- | --- |
| Refractive Index | 1.4697 | 1.4671 | 1.4699 | 1.4701 | 1.4685 |
| % Non-Volatiles | 64.3 | 63.8 | 64.7 | 65.0 | 64.2 |
| Final pH | 8.53 | 8.59 | 8.69 | 8.91 | 8.34 |
| Kinematic Viscosity (cSt) | 198 | 211 | 294 | 274 | 233 |
| Buffer Capacity (mL 0.1N HCl) | 19.2 | 10.5 | 18.8 | 15.0 | 14.1 |
| Appearance | Clear | Clear | Dark Red-Brown | Dark Red-Brown | Dark Red-Brown |
| Color (AIH SRM) | N/A | N/A | 32 | 31 | 31 |

The Refractive Index is measured by digital refractometer.

% Non-Volatiles is measured via NATM-A12. A liquid resin sample is cured in aluminum pan in convection oven with an airflow @ 105° C. for 3 hours.

Figure 2:
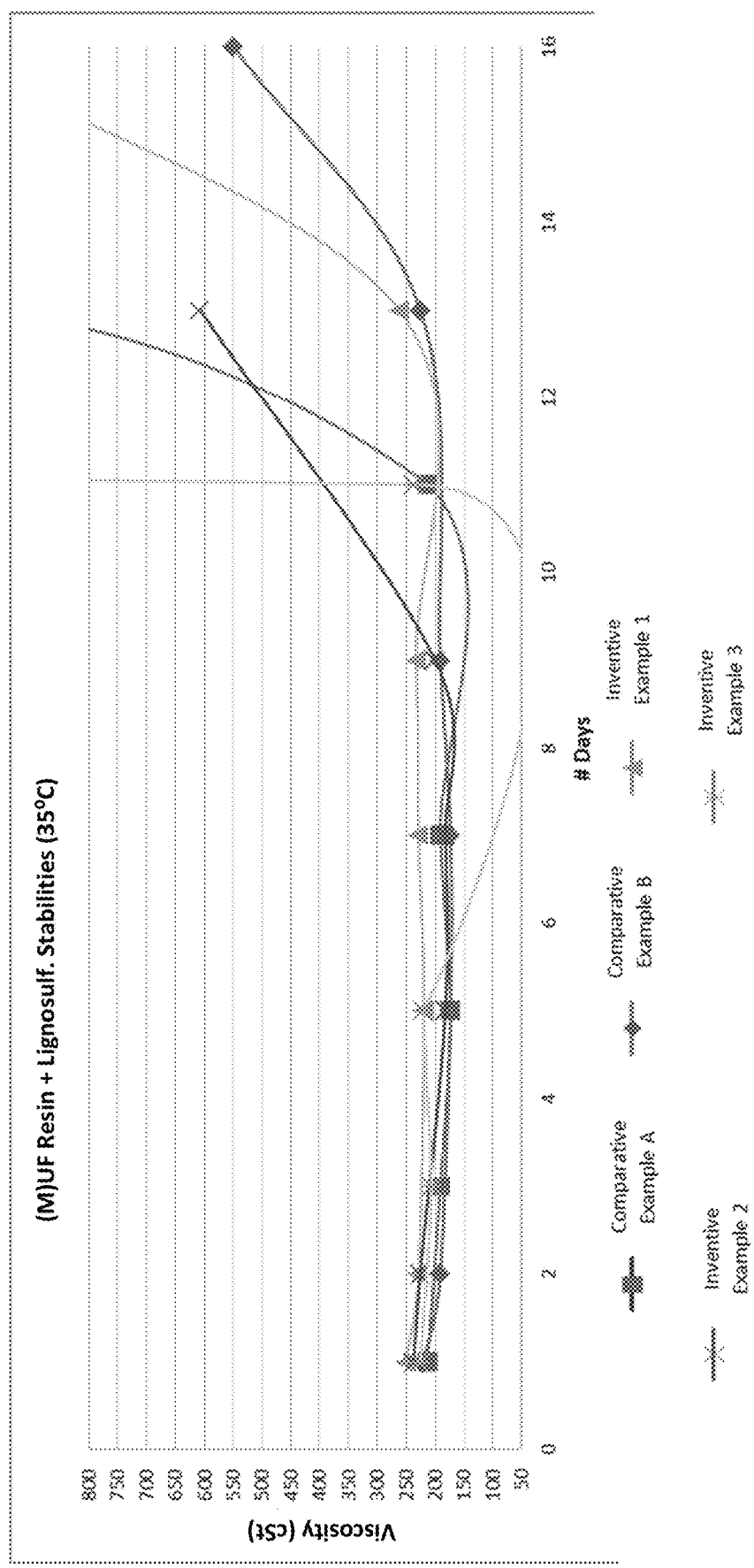
FIG. 2 shows the viscosity stability over time for Comparative Examples A and B and Inventive Examples 1-3 at 35° C.
Figure 3:
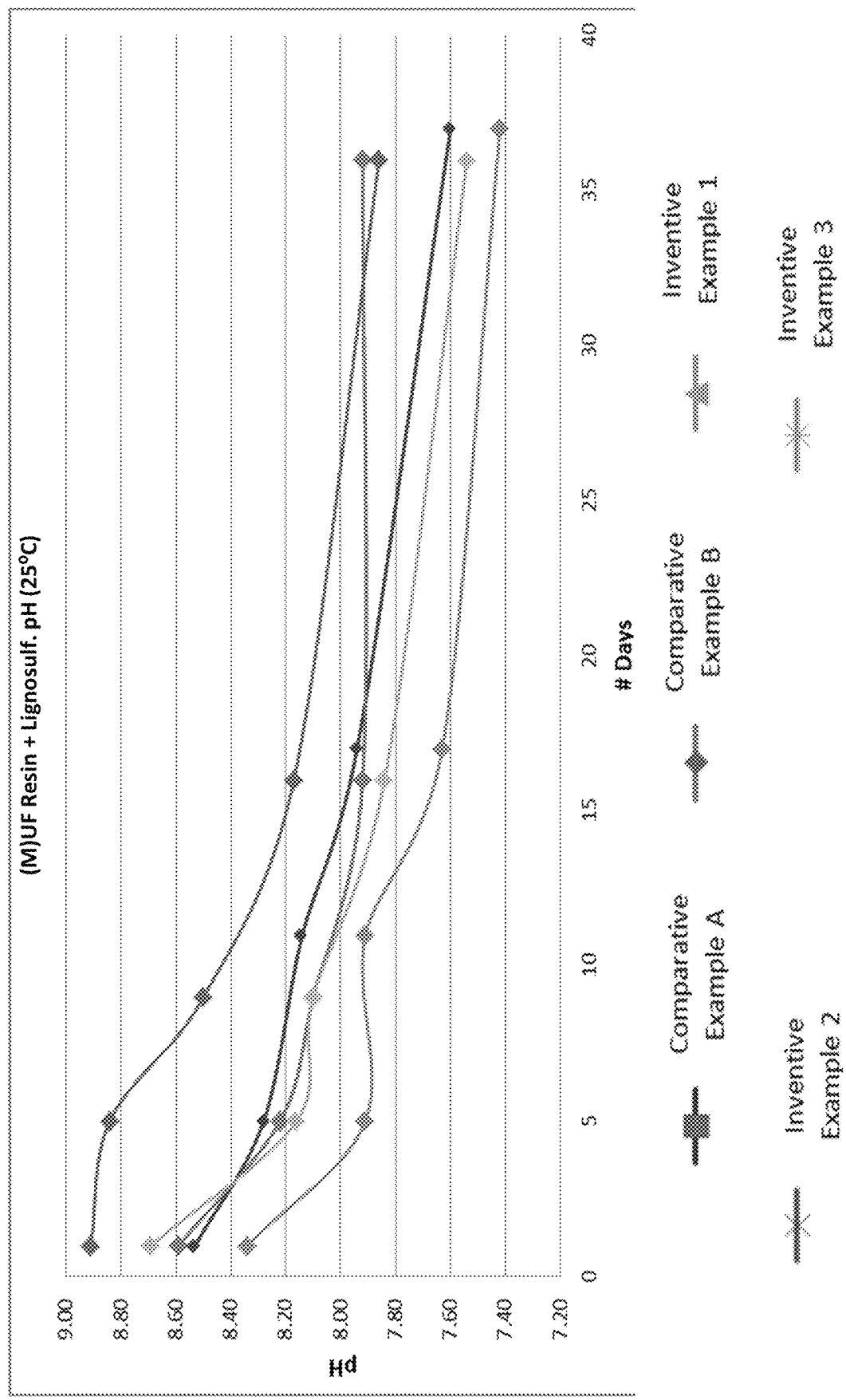
FIG. 3 shows the pH decay over time for Comparative Examples A and B and Inventive Examples 1-3 at 25° C.

The viscosity of each resin is determined immediately after the final pH is reached using the Brookfield viscosity method (NATM-B01/ASTM-D1084), at 25° C. See Table 1. FIGS. 1 and 2 show the viscosity stability over time for Comparative Examples A and B and Inventive Examples 1-3 at 25° C. and 35° C., respectively. As seen from these charts, Inventive Examples 1, 2 and 3 comprising the lignosulfonate devoid of melamine provide similar viscosity stability when compared to Comparative Examples A and B. The viscosity of the resin system is stable so as to vary by no more than 100 cSt at 25° C. for at least 20 days, preferably at least 25 days, more preferably about 20 to 48 days. FIG. 3 shows the pH decay over time for Inventive Examples 1-3 and Comparative Examples A and B at 25° C. As seen from these results, Inventive Examples 1-3 and Comparative Examples A and B demonstrated similar pH stability. In view of the fact that the inventive resin system has viscosity stability, it can be shipped in a single container as a mixture to the customer without concern of separation of components.

To determine the buffer capacity, each of the resins were measured via Acid Titration Value (ATV). The ATV method is carried out by collecting 40.0±0.1 grams of a resin material into a beaker. 150 mL of a 50:50 mixture by volume of isopropyl alcohol water was added to the beaker with resin and mixed. The solution was then titrated with 0.1 HCl increments. The buffer capacity was determined by the mL of 0.1 HCl required to achieve a pH of 4.0. The results are shown in Table 1.

The buffer capacity will depend on the system and can be manipulated so as not to be too high or too low to ensure a proper balance between cure speed and pre-cure dry out resistance. The buffer capacity can be tailored so as to be optimized for a particular apparatus used to incorporate the inventive resin system in the product. Buffer capacity requirements are dependent on resin stoichiometry and customer process. Both lignosulfonate and melamine content contribute to higher buffer capacity. The buffer capacity of the resin system is stable and will not go outside the range of 2-400 mL, or greater than 5 to 150 mL, preferably 20-60 mL of 0.1 N HCl by the ATV Method at 25° C. for at least 20 days, preferably at least 25 days, more preferably about 20-48 days.

To determine the color, within 72 hours following formation of the resin system, the colors of the resins were measured using the official AIH SRM (Standard Research Method) Number Scale for the color of beer.

Homogenous particleboards panels were prepared by blending each of Inventive Examples 1-3 and Comparative Examples A and B with a Douglas fir face furnished. The resins were applied via a spray gun with compressed air for atomization. Each of the panels were pressed in a single-opening laboratory pneumatic hot press at increasing press cycle times to obtain a cure curve to determine the relative cure speed and internal bond strength development.

Table 2 shows the parameters for preparing the particleboards.

TABLE 2

| | |
| --- | --- |
| Thickness | 0.570" Stops |
| Platen Temperature | 350° F. |
| % Resin Loading[a] | 10 wt. % |
| % Scavenger | 0% |
| % Blended Moisture Content Target[b] | 9-10% |
| Actual | Avg 9.4% |
| Density: Target | 45 pound/ft$^3$ |
| Actual | (at full cure) 43.5-44.7 pound/ft$^3$ |
| Cycle Times | 90, 120,150, 180, 210, 250 sec |
| Dry Out Temperatures[c] | 140° F., 160° F., 180° F. following the Dry out protocol. All at full cure (250 s) |
| Construction | Homogenous Face Furnish (3.7-3.9% Moisture Content) |

[a]Percent resin loading = Wt. % of resin solids/% oven dried wood
[b]% BMC = measured % MC of Resin + substrate after blending. Target % BMC will change based on specific panel construction and customer process.
[c]Dry out protocol = A resinated furnish is placed in a bag. Each resin is tested after holding resinated furnish in oven at either 140, 160 or 180 F. All panels are pressed for 250 seconds. The resinated furnish is placed in a bag to prevent loss of moisture too quickly while placed in oven. The bag is used because the bagged resinated furnish more accurately mimics the dry-out times seen on commercial apparatus.

Figure 4:
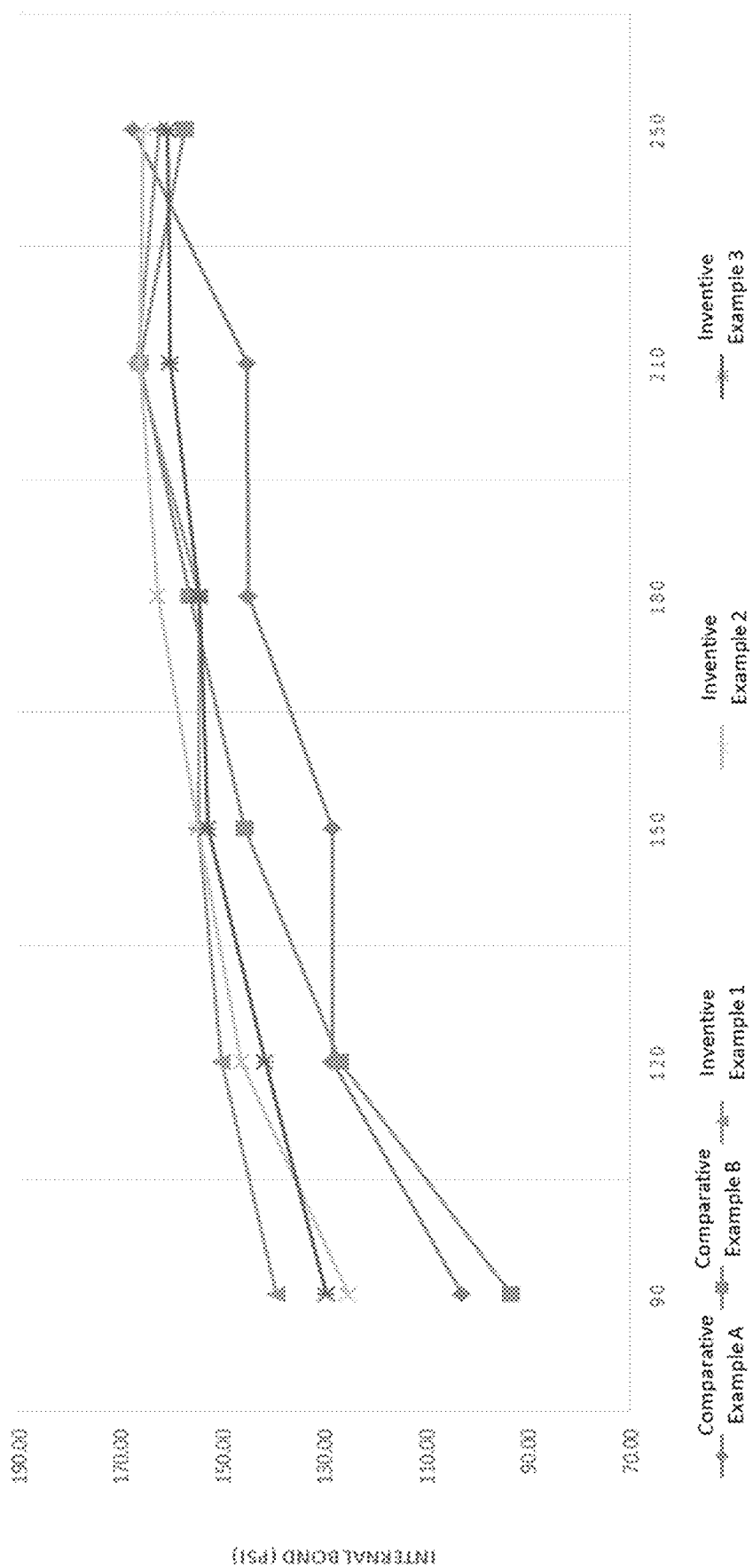
FIG. 4 shows the Average Internal Bond (IB) Curve over time in seconds for cured resins of Comparative Examples A and B and Inventive Examples 1-3.

The particleboards are also tested for bonding cure speed and dry out/pre-cure resistance. To determine the Average Internal Bond according to ASTM-D1037, the panels are pressed for 250 seconds. FIG. 4 shows the Average Internal Bond (IB) Curve over time for cured Inventive Examples 1-3 and Comparative Examples A and B.

Figure 5:
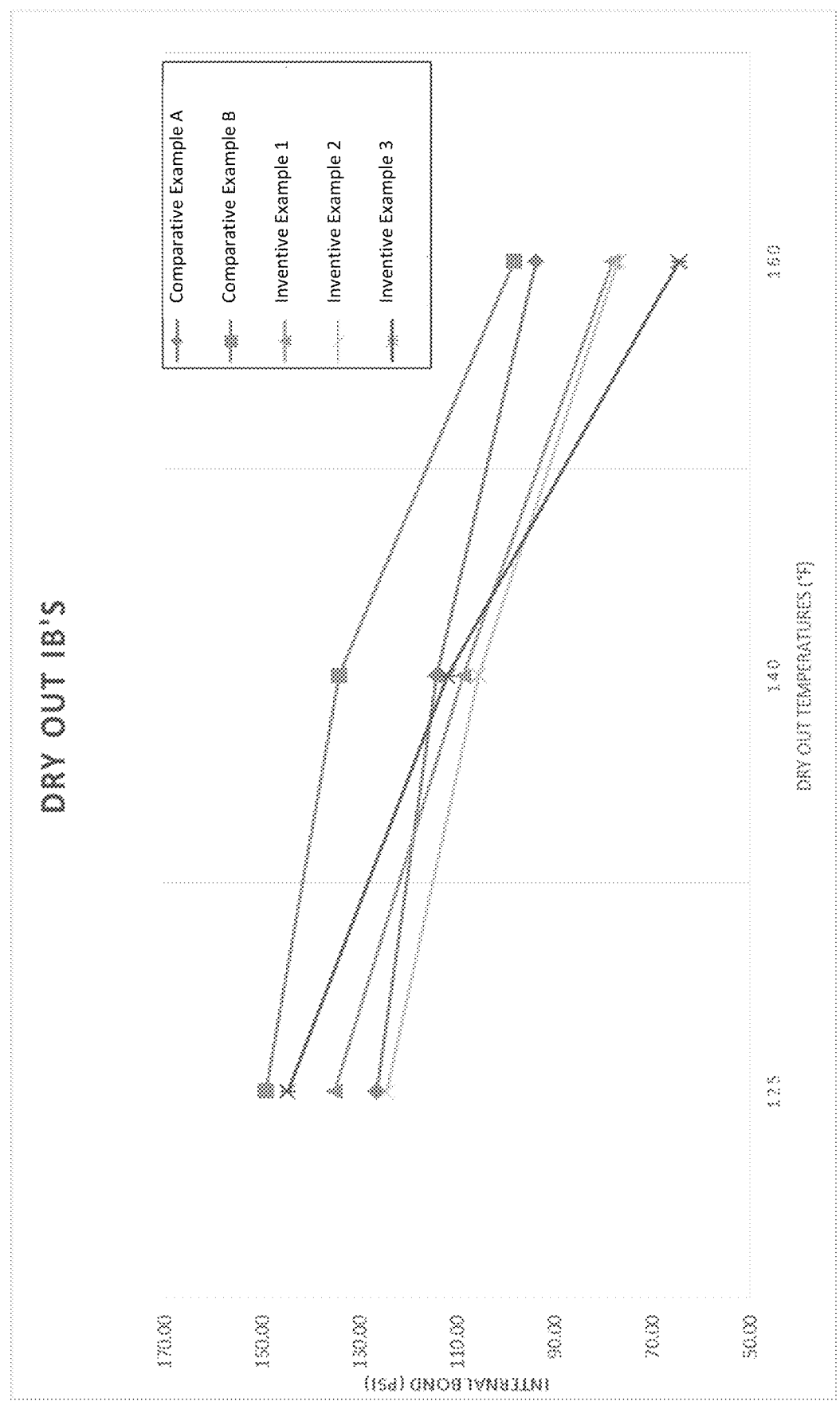
FIG. 5 shows the dry out/pre-cure Average Internal Bond of Comparative Examples A and B and Inventive Examples 1-3.

To evaluate the dry out/pre-cure AIB of the resins, the panels are placed in containers while increasing the temperature over a period of time from 125° F. to about 160° F. FIG. 5 shows the results from dry out/pre-cure Average Internal Bond of Inventive Examples 1-3 and Comparative Examples A and B.

Dry-out/pre-cure AIBs are lower than AIBs using standard panel process (without heating resinated furnish in oven) due to loss of efficiency (bonding potential) from the excess heat prior to pressing.

FIG. 4 indicates that resin compositions including lignosulfonate can actually improve the Internal Bond relative to Comparative Example A, which comprises melamine. Thus, Inventive Examples 1-3 provide resins capable of achieving suitable Internal Bond ranges much faster with the lignosulfonates.

Typically, resins that cure very quickly would correspondingly dry out at low temperatures. This is because the resin is exposed to elevated temperatures for a period of time before the apparatus is taken to curing temperatures. This pre-mature curing makes the resin lose strength after the curing step, and thus, resulting in dry out at lower temperatures. Based on this, it would be expected that Inventive Examples 1-3 would perform worse in the dry out step, since they experienced a fast cure. See FIG. 4. However, FIG. 5 indicates that Inventive Examples 1-3 have similar dry out rates when compared to Comparative Example A, comprising the melamine.

Figure 6:
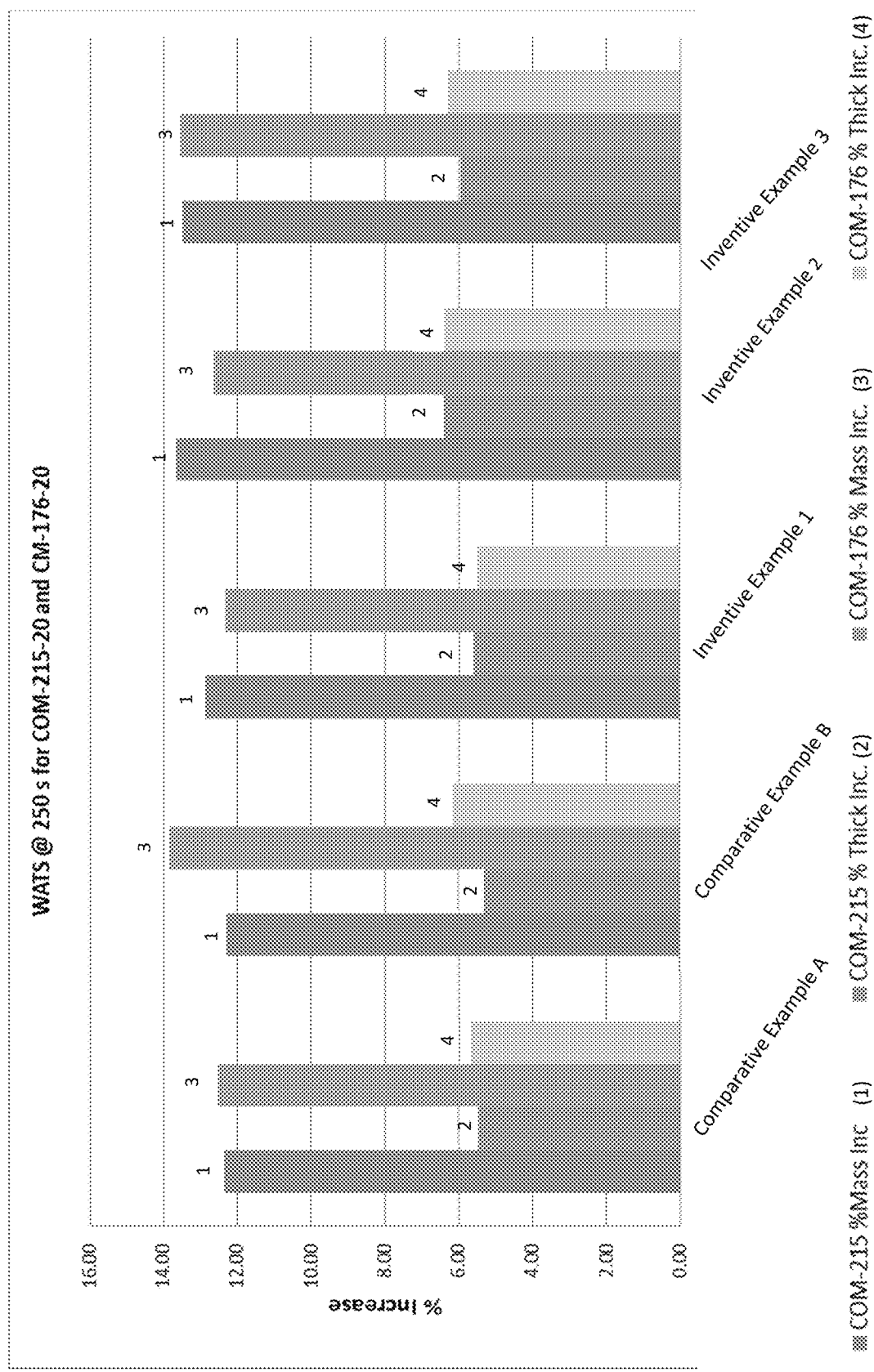
FIG. 6 shows the water tolerance and thickness swell (WATS) of cured resins of Comparative Examples A and B and Inventive Examples 1-3.

To determine the water-resistant properties, including water absorption and thickness swell, the boards were submerged into water for a period time in accordance with ASTM-D1037. The density (weight and thickness) was measured before and after submersion to determine the change. FIG. 6 shows the water tolerance and thickness swell (WATS) of cured Comparative Examples A and B and Inventive Examples 1-3.

Figure 7:
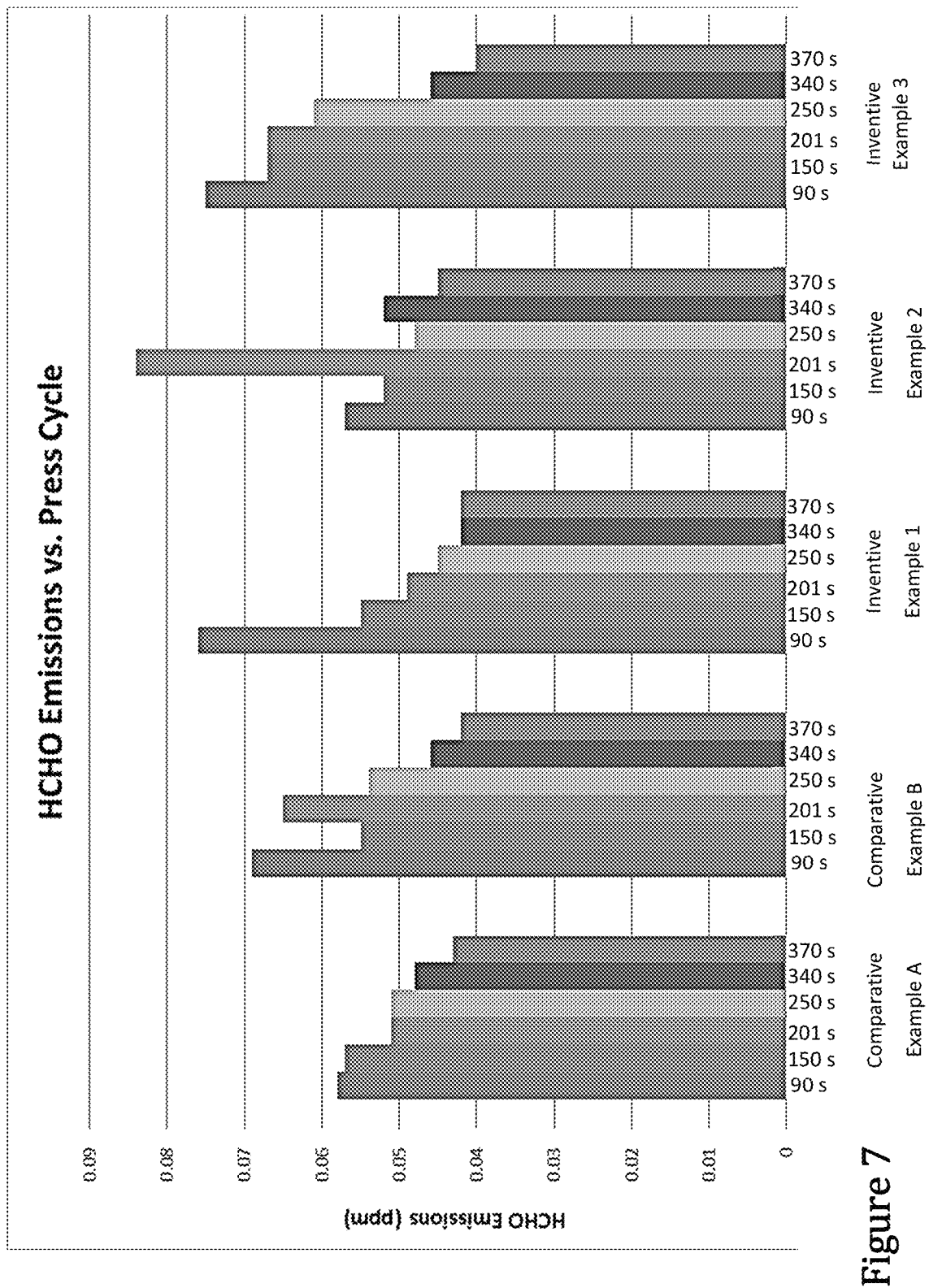
FIG. 7 shows the formaldehyde emissions vs. press cycle (90-370 seconds) for Comparative Examples A and B and Inventive Examples 1-3.

In addition to testing the boards for water resistance, the boards are tested for formaldehyde emissions. During the curing phase, the amount of formaldehyde volatilization is measured over time using ASTM-6007 and E1333. FIG. 7 shows the formaldehyde emissions vs. press cycle (90-370 seconds) for Comparative Examples A and B and Inventive Examples 1-3.

Figure 11:
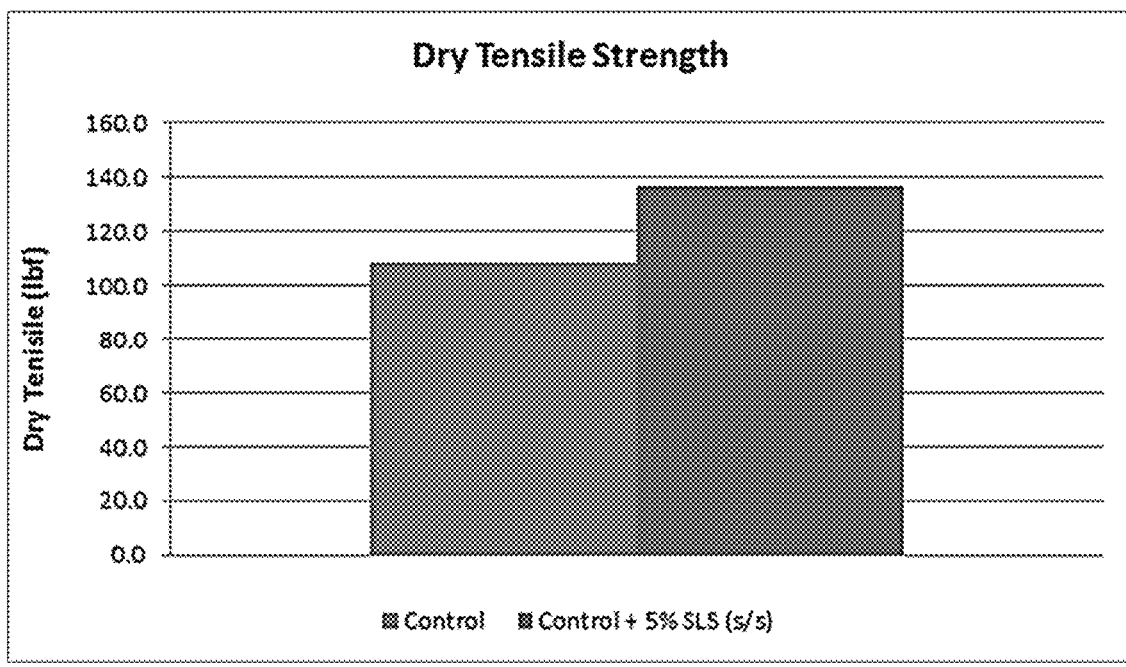
FIG. 11 shows the dry tensile strength of a glass fiber nonwoven of the present invention compared with a glass fiber nonwoven lacking the one or more lignosulfonate compounds.

A glass fiber nonwoven was prepared by mixing glass fibers with the inventive resin system comprising 5 wt. % sodium lignosulfonate. A control sample (comparative example) was prepared by mixing the glass fibers with essentially the same resin system except without any lignosulfonate. The glass fiber was an Owens Corning product, OC 9501 having an average fiber length of 1.25 inches (3.175 cm). White water (a polyacrylamide) dispersant was used. The resin system containing the glass fibers was cured at 230° C. for 15 seconds to give an average basis weight of resin of 1.65 lbs/100 ft$^2$. The average loss on ignition was 20.3%. The dry tensile strength of the glass fiber nonwoven products were tested on a Thwing-Albert tensile tester (150 kg load cell) and the results are shown in FIG. 11. The dry tensile strength shows that the inventive glass fiber nonwoven had about 25-30% improvement in the dry tensile strength over the control (comparative) example.

It is possible, and sometimes preferred, to use components in a diluted form. This includes, but is not limited to urea, formaldehyde and melamine. All weight percents described herein, unless stated otherwise, are based on the weight of the component based on the total weight (liquids and solids) of the resin system. For instance, if 2 grams of a 50 wt. % aqueous solution of urea is added to the resin system to give a total weight of 10 grams, then the urea would be present in the resin system in an amount of 10 wt. %.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

We claim:
1. A blended furnish, comprising:
a melamine-urea-formaldehyde (MUF) resin;
a lignosulfonate and does not contain a kraft lignin;
an alkaline compound;
optionally an additive; and
a plurality of substrates,
   wherein the melamine-urea-formaldehyde (MUF) resin is made prior to mixing with the lignosulfonate,
   wherein the alkaline compound is from about 0.0 wt. % to about 1 wt. % based on the total weight of the blended furnish, and
   wherein the blended furnish has a buffer capacity of 2-200 mL of 0.1 N HCl by the Acid Titration Value (ATV) Method using 20 grams of blended furnish for a period of time up to 20 days.

2. The blended furnish of claim 1, wherein the substrate is selected from the group consisting of lignocellulose substrates, natural fibers substrates, synthetic fibers substrates, glass fibers substrates and mixtures thereof.

3. The blended furnish of claim 1, wherein the lignosulfonate is selected from the group consisting of calcium lignosulfonate, magnesium lignosulfonate, potassium lignosulfonate, chrome lignosulfonate, ammonium lignosulfonate, sodium lignosulfonate and mixtures thereof.

4. The blended furnish of claim 1, wherein the lignosulfonate is blended with other additives selected from the group consisting of a raw lignin in powder or liquid form, a lignin added to additives combined with additional water, a urea water, a scavenger, a filler, an extender, a wax, a catalyst, a release agent, a buffering agent, a surfactant and mixtures thereof.

5. The blended furnish of claim 1, wherein the lignosulfonate is in solid powder form, liquid form or combinations thereof.

6. The blended furnish of claim 1, wherein the alkaline compound comprises ammonia, an amine, a Group I metal hydroxide, a Group II metal hydroxide, Group I metal carbonate, a Group II metal carbonate, or combinations thereof.

7. The blended furnish of claim 1, wherein the additive is selected from the group consisting of catalyst, filler, buffer, base, tackifier, wax, water, scavenger, boron compound, phosphate, halogen compound, nitrogen compound, and mixtures thereof.

8. The blended furnish of claim 1, wherein one or more additives are present.

9. The blended furnish of claim 1, wherein the pH of the blended furnish varies from about pH 3.0 to pH below 10.0.

10. The blended furnish of claim 9, wherein the pH of the blended furnish varies from about pH 3.0 to about pH 9.5.

11. The blended furnish of claim 1, wherein the blended furnish comprising the one or more lignosulfonate salt has a distinct color that is noticeably different from the color of pure UF/MUF resins.

12. The blended furnish of claim 1, wherein the lignocellulose substrate comprises a granulated lignocellulose substrate, a flake lignocellulose substrate, a fibrous lignocellulose substrate or combinations thereof.

13. The blended furnish of claim 1, wherein the blended furnish comprises
   about 0.0 wt. % to about 50 wt. % of or the MUF resin;
   about 0.1 wt. % to about 30 wt. % of the lignosulfonate;
   about 0.0 wt. % to about 1 wt. % of the alkaline compound; and
   about 0.0 wt. % to about 40 wt. % of the additive,
   wherein each weight percent is based on the total weight of the blended furnish.

14. A composite product, comprising:
a plurality of substrates; and
at least partially cured blended furnish of claim 1.

15. The composite product of claim 14, wherein the composite product comprises plywood, oriented strand board, oriented strand lumber, laminated veneer lumber, laminated veneer timber, laminated veneer boards, particleboard, fiberboard, chipboard, flakeboard, high density fiberboard, medium density fiberboard, waferboard, hardwood, softwood plywood, veneer timber, parallel standard lumber, oriented stranded lumber, or combinations thereof.

16. The blended furnish of claim 1, wherein each component in the blended furnish can be added separately in any order at pH below 10.0.

17. The blended furnish of claim 1, wherein the resin system has a pH stability of about 30 days or more.

18. A method for preparing a blended furnish, comprising:
adding a plurality of substrates;
mixing a melamine-urea-formaldehyde (MUF) resin with an amine and water at a pH of 5-11, preferably pH of 6 to pH below 10;
optionally adding one or more additives;
adding a lignosulfonate salt and does not contain a kraft lignin;
optionally adding one or more additives to form the blended furnish,
   wherein the melamine-urea-formaldehyde (MUF) resin is made prior to mixing with the lignosulfonate,
   wherein the amine is from about 0.0 wt. % to about 1 wt. % based on the total weight of the blended furnish, and
   wherein the blended furnish has a buffer capacity of 2-200 mL of 0.1 N HCl by the Acid Titration Value (ATV) Method using 20 grams of blended furnish for a period of time up to 20 days.

19. The method of claim 18, wherein the lignosulfonate is selected from the group consisting of calcium lignosulfonate, magnesium lignosulfonate, potassium lignosulfonate, chrome lignosulfonate, ammonium lignosulfonate, sodium lignosulfonate and mixtures thereof.

20. A method for preparing a blended furnish, comprising:
adding a plurality of substrates;
mixing a melamine-urea-formaldehyde (MUF) resin, a lignosulfonate salt and does not contain a kraft lignin with an amine and water at a pH of 5-11, preferably pH of 6 to pH below 10;
optionally adding one or more additives to form the blended furnish,
   wherein the melamine-urea-formaldehyde (MUF) resin is made prior to mixing with the lignosulfonate,
   wherein the amine is from about 0.0 wt. % to about 1 wt. % based on the total weight of the blended furnish, and
   wherein the blended furnish has a buffer capacity of 2-200 mL of 0.1 N HCl by the Acid Titration Value (ATV) Method using 20 grams of blended furnish for a period of time up to 20 days.

21. The method of claim 20, wherein the lignosulfonate is selected from the group consisting of calcium lignosulfonate, magnesium lignosulfonate, potassium lignosulfonate, chrome lignosulfonate, ammonium lignosulfonate, sodium lignosulfonate and mixtures thereof.

22. A method for preparing a blended furnish, comprising:
adding a plurality of substrates;
mixing a lignosulfonate salt and does not contain a kraft lignin with the substrates;
adding a melamine-urea-formaldehyde (MUF) resin with an amine and water at a pH of 5-11, preferably pH of 6 to pH below 10;
optionally adding one or more additives to form the blended furnish,
   wherein the amine is from about 0.0 wt. % to about 1 wt. % based on the total weight of the blended furnish, and
   wherein the blended furnish has a buffer capacity of 2-200 mL of 0.1 N HCl by the Acid Titration Value (ATV) Method using 20 grams of blended furnish for a period of time up to 20 days.

23. The method of claim 22, wherein the lignosulfonate is selected from the group consisting of calcium lignosulfonate, magnesium lignosulfonate, potassium lignosulfonate, chrome lignosulfonate, ammonium lignosulfonate, sodium lignosulfonate and mixtures thereof.

24. A blended furnish, comprising:
a melamine-urea-formaldehyde (MUF) resin;
a lignosulfonate and does not contain a kraft lignin;
an alkaline compound;
optionally an additive; and
a plurality of substrates,
   wherein the melamine-urea-formaldehyde (MUF) resin is made prior to mixing with the lignosulfonate,
   wherein the alkaline compound is from about 0.0 wt. % to about 1 wt. % based on the total weight of the blended furnish,
   wherein the resin system has a color range of about 4 to about 40 using the AIH Standard Research Method within 72 hours of the formation of the blended furnish,
   wherein the color of the resin system is a dark red-brown color, and
   wherein the blended furnish has a buffer capacity of 2-200 mL of 0.1 N HCl by the Acid Titration Value (ATV) Method using 20 grams of blended furnish for a period of time up to 20 days.

25. A blended furnish, comprising:
a melamine-urea-formaldehyde (MUF) resin;
a lignosulfonate and does not contain a kraft lignin;
an alkaline compound;
optionally an additive; and
a plurality of substrates,
   wherein the melamine-urea-formaldehyde (MUF) resin is made prior to mixing with the lignosulfonate,
   wherein the alkaline compound is from about 0.0 wt. % to about 1 wt. % based on the total weight of the blended furnish,
   wherein the resin system has a viscosity stability of about 30 days or more,
   wherein the viscosity of the resin system is stable so as to vary by no more than 100 cSt at 25° C. for at least 20 days, and
   wherein the blended furnish has a buffer capacity of 2-200 mL of 0.1 N HCl by the Acid Titration Value (ATV) Method using 20 grams of blended furnish for a period of time up to 20 days.

* * * * *